(12) United States Patent
Minemoto et al.

(10) Patent No.: US 6,542,647 B2
(45) Date of Patent: Apr. 1, 2003

(54) OPTICAL SIGNAL TRANSMISSION SYSTEM AND MAGNETO-OPTICAL MODULATOR DESIGNED TO ESTABLISH MODULATION OVER WIDE RANGE FOR USE IN THE SAME

(75) Inventors: Hisashi Minemoto, Ootsu (JP); Nobuki Itoh, Osaka (JP); Daisuke Ishiko, Osaka (JP); Satoshi Ishizuka, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/984,005

(22) Filed: Oct. 26, 2001

(65) Prior Publication Data

US 2002/0051279 A1 May 2, 2002

(30) Foreign Application Priority Data

Oct. 27, 2000 (JP) ........................................ 2000-328552

(51) Int. Cl.[7] .......................... G02F 1/295; G11B 21/04; H01Q 19/00

(52) U.S. Cl. ............................... 385/6; 385/39; 385/42; 385/45; 359/280; 359/281; 359/282; 359/283; 343/741; 343/756

(58) Field of Search ................................ 359/280, 281, 359/282, 283; 344/244; 385/1, 2, 6, 11, 14, 39, 40, 45, 42; 343/741, 756

(56) References Cited

U.S. PATENT DOCUMENTS

| | | | | |
|---|---|---|---|---|
| 3,811,096 A | * | 5/1974 | Dillon et al. ................ 359/283 |
| 4,243,936 A | * | 1/1981 | Papp et al. .................... 324/96 |
| 4,529,875 A | * | 7/1985 | Brogardh et al. ....... 250/227.23 |
| 5,267,336 A | * | 11/1993 | Sriram et al. .................. 385/2 |
| 5,491,334 A | * | 2/1996 | Gartenberg et al. .... 250/227.21 |
| 5,500,729 A | * | 3/1996 | Redman et al. ............ 356/5.09 |
| 5,517,303 A | * | 5/1996 | Cole et al. ................... 356/479 |
| 5,640,021 A | * | 6/1997 | Lee et al. ...................... 257/21 |
| 6,243,193 B1 | * | 6/2001 | Katsuragawa ............... 359/280 |
| 6,476,956 B1 | * | 11/2002 | Cottrell et al. .............. 359/280 |

FOREIGN PATENT DOCUMENTS

| | | | |
|---|---|---|---|
| JP | 4-172261 | 6/1992 | ................ 385/6 X |
| JP | 7-199137 | 8/1995 | ................ 385/6 X |
| JP | 10-186189 | 7/1998 | ................ 385/6 X |

OTHER PUBLICATIONS

Minemoto et al., U.S. Patent Application US2002/0051279A1, published May 2, 2002.*
Cottrell et al., U.S. Patent Application US2002/0149830A1, published Oct. 17, 2002.*

(List continued on next page.)

*Primary Examiner*—Brian Healy
(74) *Attorney, Agent, or Firm*—Parkhurst & Wendel, L.L.P.

(57) ABSTRACT

An optical signal transmission system equipped with a magneto-optical modulator is provided. The magneto-optical modulator works to modulate an optical beam emitted from a light source and consists of a polarizer, a magneto-optical element, an analyzer, a dc field generator, a high-frequency field generator, and an impedance adjuster. The dc field generator works to apply a dc bias field to the magneto-optical element. The high-frequency generator is responsive to the high-frequency signal from said high-frequency signal generator to apply a high-frequency field to the magneto-optical element. The impedance adjuster works to adjust impedance of the high-frequency field generator for establishing effective transmission of the high-frequency signal to the high-frequency field generator, thereby increasing a modulation range up to frequencies higher than an upper limit of typical magneto-optical modulators. The application of the dc bias field and use of the impedance adjuster realizes the magneto-optical modulator which is useful up to a ferromagnetic resonance frequency.

37 Claims, 17 Drawing Sheets

OTHER PUBLICATIONS

"Sensitivity Improvement of Fiber Edge Magneto–Optic Probe by Applying a Transverse DC Magnetic Field, 4p–Q–4" (extended abstract) by Yamazaki et al, The Manuscript of the Lecture of the Japan Society of Applied Physics, Sep. 2000, p. 1043.

"Optical Integrated Circuit" by Nishihara et al., published by Ohm Company, Feb. 25, 1985, pp 298–304.

"Fiber–Optic Monitoring Sensor System for Power Distribution Lines" by Ishiko et al.; National Technical Report, vol. 38, No. 2, Apr. 1992, pp. 127–133.

"Ultrafast Magneto–Optic Sampling of Picosecond Current Pulses" by Elezzabi et al., Appl. Phys. Lett. 68(25), Jun. 17, 1996, pp. 3546–3548.

"A Sensitive and Compact Magnetometer Using Faraday Effect in YIG Waveguide" by Doriath et al., J. Appl. Phys. 53(11), Nov. 1982, pp. 8263–8265.

"Switching and Modulation of Light in Magneto–Optic Waveguides of Garmet Films" by Tien et al., Appl. Phys. Lett., vol. 21, No. 8, Oct. 15, 1972, pp. 394–396.

"Estimation of Direct Current Bias and Drift of Ti:LiNbo3 Optical Modulators" by Nagata et al., J. Appl. Phys. 76(3), Aug. 1, 1994, pp. 1405–1408.

* cited by examiner

FROM HIGH-FRE.
SIGNAL GENERATOR

FROM HIGH-FRE.
SIGNAL GENERATOR

OPTICAL SIGNAL TRANSMISSION SYSTEM AND MAGNETO-OPTICAL MODULATOR DESIGNED TO ESTABLISH MODULATION OVER WIDE RANGE FOR USE IN THE SAME

BACKGROUND OF THE INVENTION

1. Technical Field of the Invention

The present invention relates generally to an optical signal transmission system and an improved structure of a magneto-optical modulator for use in the same which utilizes the Faraday effect designed to modulate an optical beam up to a higher frequency.

2. Background Art

Most of external optical modulators employed in typical optical signal transmission systems utilize the electro-optical effect (i.e., Pockel's effect). Particularly, most of optical signal transmission systems for use in optical communication employ optical waveguide modulators utilize the electro-optical effect of an LiNbO3 crystal (e.g., Nishihara et al., "Optical Integrated Circuit" published by Ohm Company, pp. 298–304 (1985)). The optical modulators using the electro-optical crystal, however, experience dc drifts (e.g., J. Appl. Phys. Vol. 76, No. 3, pp. 1405–1408 (1994)) or optical damage and has a difficulty in maintaining the reliability for long use. Alleviating such a characteristic deterioration involves an increase in manufacturing cost.

In recent years, there have been proposed optical signal transmission systems which receive an electric wave through an antenna and apply it to an electro-optics modulator in the form of a high-frequency signal (e.g., Japanese Patent First Publication Nos. 4-172261 and 10-186189).

Magneto-optical modulators using the magneto-optical effect have been studied for a number of years (e.g., Appl. Phys. Lett. Vol. 21 No. 8, pp. 394–396 (1972)), but they are still not in practical use because their response frequencies are lower than those of electro-optics modulators and thus being researched for use as optical magnetic field sensors or current sensors (e.g., J. Appl. Phys. Vol. 53 No. 11, pp. 8263–8265 (1982) and National Technical Report, Vol. 38 No. 2, pp. 127–133 (1992)).

Japanese Patent First Publication No. 7-199137 teaches the use of an magneto-optical modulator as a polarization modulator in an optical signal transmission system. The response rate of the magneto-optical modulator is, however, as low as several tens kHz. U.S. Pat. No. 6,141,140 teaches the use of an optical isolator as a magneto-optical modulator, but its response rate is also low. This is because typical optical isolators are usually covered with a metal member or employ metal magnets for applying a dc magnetic field thereto, so that application of a high-frequency field will result in generation of the eddy current, which makes it difficult to apply a high-frequency field at several tens kHz or more from the outside of the optical isolator. The optical isolator is in practice employed as an optical modulator and has the disadvantage that changing the degree of the magneto-optical effect (i.e., the Faraday effect) using an external magnetic field causes the light to be returned to an unwanted direction (i.e., toward a light source).

In recent years, magneto-optical modulators designed to measure the current in a semiconductor electric substrate in which a dc bias field is applied to a magneto-optical crystal film are also researched (e.g., Appl. Phys Lett. Vol. 68 No. 25, pp. 3546–3548 (1996) and Extended Abstract (61th Annual Meeting, 2000), The Japan Society of Applied Physics, University of Tokyo, 2000, 4p-Q-4).

Most of typical optical signal transmission systems are designed to modulate the driving current to be applied to a semiconductor laser at higher frequencies or utilize an optical waveguide modulator exhibiting the electro-optical effect (i.e., the Pockel's effect). Directly modulating the driving current applied to the semiconductor laser does not require a special modulator, thus providing the advantage that the optical signal transmission system will be simple in structure. It is, however, difficult to modulate the light emitted from the semiconductor laser at frequencies higher than several GHz. Additionally, actuating a driver of the semiconductor laser at higher frequencies may result in a failure in desired modulating operation or difficulty in transmitting an output far away because of laser chirp due to the high-speed modulation.

Further, in an optical signal transmission network consisting of a great number of optical fibers, an optical signal usually contains noises arising from multi-reflection from optical parts installed in each transmission line. In order to avoid this problem, a light source such as an LED having a wide emission spectrum is employed occasionally. The frequency band in which the LED can be energized is, however, on the order of 100 MHz (see Hiroo Yonetsu, "Optical Communication Device Engineering" published by Kogaku Shoin, pp. 135–141 (1991)) thus requiring a special optical modulator for modulating an output of the LED at frequencies higher then 100 HHz.

Optical waveguide modulators utilizes the electro-optical effect. In this case, the Pockel's effect is capable of high-speed modulation of a laser beam or light produced by an LED and does not encounter the problem of chirping, but faces, as described above, the problems of dc drifts and optical damage. Alleviating these involves an increase in manufacturing cost. In optical signal transmission systems in which an electric signal received by an antenna is used to modulate an optical beam (i.e., optical carrier wave), a modulator is usually installed in the open air and thus will have the problems of the dc drifts and optical damage. Further, most of optical waveguide modulators using the Pockel's effect are designed for a single mode. It is usually difficult to produce a waveguide having a greater core diameter of several tens of $\mu$m to several hundreds of $\mu$m. The optical waveguide modulators, thus, encounter the problem in that it is difficult to modulate at high speeds an output of a LED which requires an optical fiber having a great core diameter for transmitting a sufficient quantity of light, an output of an optical amplifier which is increased greatly in power, or an output of a fiber laser (greater in core diameter than several tens of $\mu$m.

Magneto-optical modulators utilizing the Faraday effect are also being researched which apply a dc bias field in parallel to a magneto-optical crystal film installed in a transmission line fabricated on a semiconductor substrate or a microstrip line and monitor the waveform of current flowing through the line. The structure which monitors the waveform of current flowing through the line on the semi-conductor substrate (e.g., Appl. Phys. Lett. Vol. 68 No. 25, pp. 3546–3548 (1996)), however, faces the problem in that the unadjustment of impedance of the transmission line on the substrate causes the wave ringing. The structure does not use an optical fibers as an optical transmission line and is unsuitable for optical signal transmission systems. The other structure which measures the waveform of current flowing through the microstrip line (e.g., Extended Abstract (61th Annual Meeting, 2000), The Japan Society of Applied Physics, University of Tokyo, 2000, 4p-Q-4) has an analyzer disposed behind an optical fiber connected to an output of a magneto-optical element and poses the problem in that increasing the length of the optical fiber will cause a linear polarized light to experience random polarization in the optical fiber, thus resulting in a difficulty in modulating the intensity an output of the analyzer. Further, the above magneto-optical modulators are designed to apply the dc bias field to the magneto-optical crystal film in the same direction as that of application of a high-frequency field. The application of the dc bias field great enough to change the magneto-optical crystal film into a monodomain structure will cause the magneto-optical crystal film to be saturated magnetically, thus resulting in an decrease in magnitude of a modulated output signal or failure in outputting a modulated signal.

SUMMARY OF THE INVENTION

It is therefore a principal object of the invention to avoid the disadvantages of the prior art.

It is another object of the invention to provide an improved structure of a magneto-optical modulator capable of modulation of an optical beam or carrier over a wide range.

It is still object of the invention an optical signal transmission system equipped with a magneto-optical modulator which is higher in reliability for an increased period of time and capable of transmission of an optical signal without DC drifts and optical damage.

According to one aspect of the invention, there is provided an optical signal transmission system. The optical signal transmission system comprises: (a) a light source emitting an optical beam; (b) a high-frequency signal generator producing a high-frequency signal; (c) a magneto-optical modulator modulating the optical beam emitted from the light source; (d) an optical fiber transmitting the optical beam modulated by the magneto-optical modulator; and (e) an optical receiver receiving the modulated optical beam transmitted through the optical fiber. The magneto-optical modulator includes a polarizer, a magneto-optical element, an analyzer, a dc field generator, a high-frequency field generator, and an impedance adjuster. The dc field generator works to apply a dc bias field to the magneto-optical element. The high-frequency generator is responsive to the high-frequency signal from the high-frequency signal generator to apply a high-frequency field to the magneto-optical element. The impedance adjuster works to adjust impedance of the high-frequency field generator for establishing effective transmission of the high-frequency signal to the high-frequency field generator.

The application of the dc bias field to the magneto-optical element and use of the impedance adjuster between the high-frequency signal generator and the high-frequency field generator enables the magneto-optical modulator to produce modulation at high speeds, which cannot be achieved by conventional magneto-optical modulators. The realization of such high-speed modulation is attributed to the facts that the adjustment of the impedance of the high-frequency field generator through the impedance adjuster serves to achieve the effective transmission of the high-frequency signal to the high-frequency field generator and the application of the high-frequency field causes a multi-domain structure of the magneto-optical modulator to be translated into a monodomain structure. Usually, a frequency response limit of movement of a domain wall between domains of a magneto-optical element lies within a range of several tens to several hundreds MHz, so that the domain wall does not respond at frequencies higher than that range. It is, thus, impossible to use such a magneto-optical element in an optical modulator for an optical signal transmission system required to respond at high speeds. This problem may be solved by the structure of the invention as described above. Specifically, the application of the dc bias field to the magneto-optical element results in conversion of the multi-domain structure to the monodomain structure, so that the domain wall disappears, thus resulting in disappearance of the movement of the domain wall that is a factor of determination of an upper limit frequency of modulation, thereby allowing the speed of the modulation to be increased.

In the preferred mode of the invention, the magneto-optical element is made of a multi-domain magneto-optical material. The dc field generator produces the dc bias field which is greater than a saturation field of the magneto-optical element.

The application of the dc bias field to the magneto-optical element is oriented at 90°±30° to a direction of application the high-frequency field to the magneto-optical element.

The direction of application of the high-frequency field to the magneto-optical element may be oriented in a direction of an axis of easy magnetization of the magneto-optical element. In a case where the magneto-optical element has a length, the direction of application of the high-frequency field to the magneto-optical element may be oriented substantially parallel to the length of the magneto-optical element, thereby minimizing the demagnetizing factor of the magneto-optical element.

The optical fiber is implemented by a graded index optical fiber or a polarization-maintaining fiber.

The optical beam is inputted at 90°±15° to an input surface of the magneto-optical element of the magneto-optical modulator.

The light source is implemented by one of an LED and a fiber laser.

An optical amplifier may be disposed between the light source and the magneto-optical modulator.

A lens may be disposed between the light source and the magneto-optical modulator.

A coupler may be provided which is connected to the magneto-optical modulator through the optical fiber. A mirror may be disposed on an end surface of the magneto-optical element opposite the input surface to produce a return of the optical beam modulated by the magneto-optical element. The coupler is also connected to the optical receiver to direct the return of the modulate optical beam to the optical receiver.

The high-frequency signal generator may be implemented by an antenna designed to receive the high-frequency signal in the form of an electric wave and transmit the high-frequency signal to the high-frequency field generator. The antenna may be one of a Yagi antenna, a loop antenna, and a parabola antenna.

According to another aspect of the invention, there is provided a magneto-optical modulator. The magneto-optical modulator comprises: (a) a polarizer to which an optical beam is inputted; (b) a magneto-optical element; (c) an analyzer outputting the optical beam from the magneto-optical element; (d) a dc field generator working to apply a dc bias field to the magneto-optical element; (e) a high-frequency field generator working to apply a high-frequency field to the magneto-optical element; and (f) an impedance adjuster working to adjust impedance of the high-frequency field generator.

In the preferred mode of the invention, the magneto-optical element is made of a magneto-optical material which has a multi-domain structure in the absence of application of the dc bias field. The dc field generator produces the dc bias field which is greater than a saturation field of the magneto-optical element.

The application of the dc bias field to the magneto-optical element may be oriented at 90°±30° to a direction of application the high-frequency field to the magneto-optical element.

The direction of application of the high-frequency field to the magneto-optical element may be oriented in a direction of an axis of easy magnetization of the magneto-optical element. In a case where the magneto-optical element has a length, the direction of application of the high-frequency field to the magneto-optical element may be oriented substantially parallel to the length of the magneto-optical element, thereby minimizing the demagnetizing factor of the magneto-optical element.

The magneto-optical element may be made of one of a bulk crystal, a polycrystal sintered body, a crystal film, and a composite containing resin and magneto-optical material dispersed in the resin.

The magneto-optical element may be made of a Bi-substituted garnet crystal film.

The frequency of the high-frequency field is 200 MHz or more.

The impedance adjuster may be implemented by an electric filter designed to allow a high-frequency signal of a preselected frequency to pass therethrough and be applied to the high-frequency field generator or by a resonator designed to have the high-frequency signal of the preselected frequency resonate.

The impedance adjuster may alternatively be implemented by an electric filter designed to allow high-frequency signals of at least two different frequencies to pass therethrough and be applied to the high-frequency field generator or by a resonator designed to have the high-frequency signals of the different frequencies resonate.

The dc field generator may be implemented by permanent magnets. The permanent magnets are each made of one of a ferrite material, a Sm—Co based material, and a Nd—Fe—B based material.

The dc field generator may alternatively consists of an electromagnet and a dc generator supplying current to the electromagnet.

The dc field generator may be geometrically designed so as to form a substantially closed magnetic circuit.

The polarizer, the magneto-optical element, and the analyzer may be fabricated in a single substrate.

The polarizer, the magneto-optical element, and the analyzer may be interposed between ferules arranged in alignment.

The high-frequency field generator may be installed on an end surface of the magneto-optical element.

The magneto-optical element is so oriented that the optical beam is inputted at 90°±15° to an input surface of the magneto-optical element.

The high-frequency field generator may be implemented by a coil whose minimum inner diameter is within a range of 10 $\mu$m to 1000 $\mu$m.

The magneto-optical element may alternatively be made of an optical wave guide made of a garnet crystal film.

The impedance adjuster may be made up of a TEM cell and a non-reflective terminator.

The impedance adjuster may be designed to resonate at a give frequency.

An electromagnetic wave shield casing may further be provided in which covers the polarizer, the magneto-optical element, the analyzer, and the high-frequency field generator.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
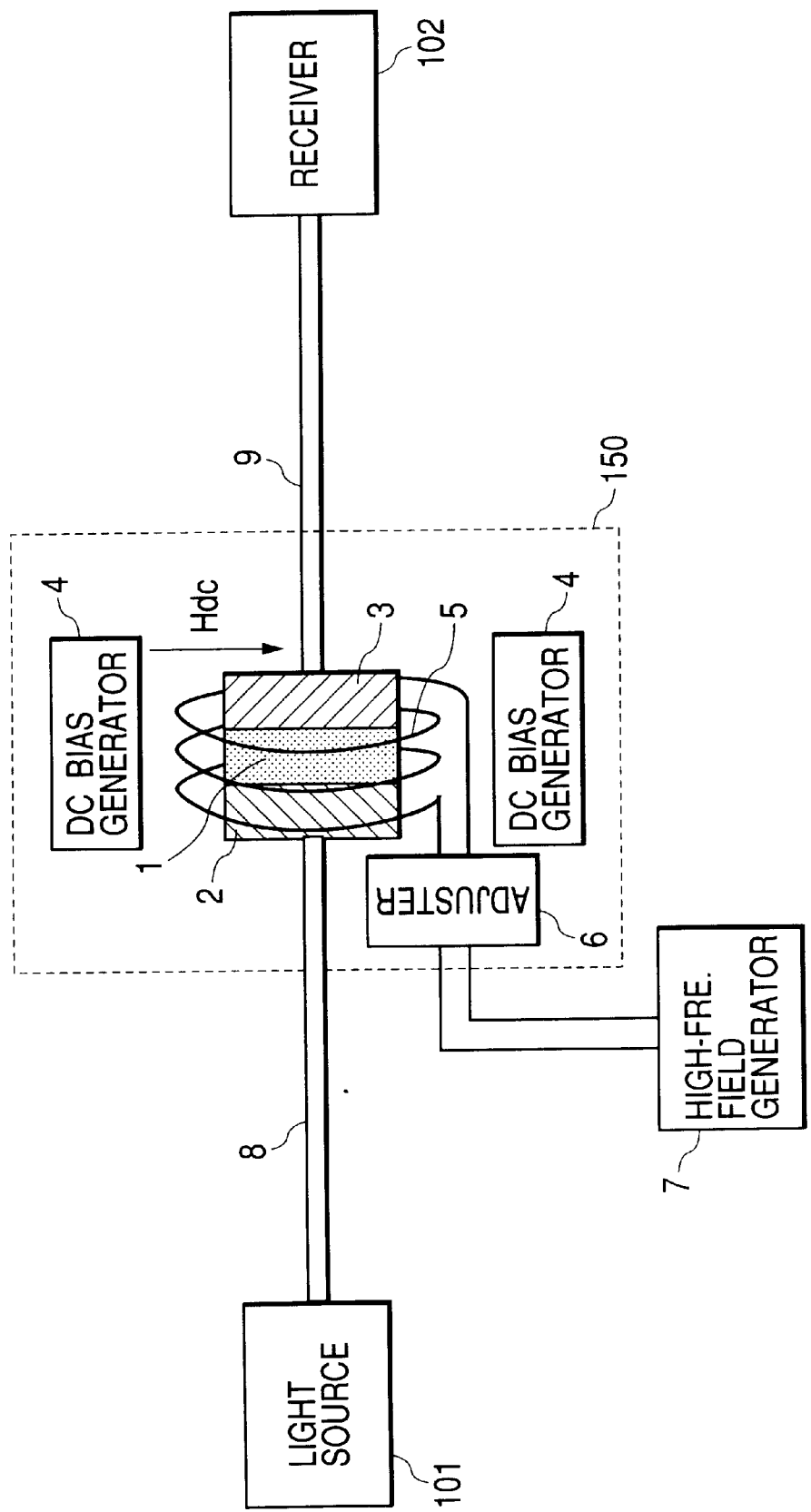
FIG. 1 is a block diagram which shows an optical signal transmission system equipped with a magneto-optical modulator according to the first embodiment of the invention.

Referring to the drawings, wherein parts designated by like terms have like structures in several views unless otherwise specified, particularly to FIG. 1, there is shown an optical signal transmission system equipped with a magneto-optical modulator 150 according to the first embodiment of the invention.

An optical carrier wave or light emitted from a light source 101 travels through an optical fiber 8 and enters the magneto-optical modulator 150 which utilizes the Faraday effect of a magneto-optical element 1. The magneto-optical modulator 150 consists of a polarizer 2, the magneto-optical element 1, an analyzer 3, a high-frequency field generator 5, an impedance adjuster 6, and a dc field generator 4. The magneto-optical element 1 is made of, for example, a bulk crystal, a polycrystal sintered body, a crystal film formed by, for example, the vapor phase epitaxy, or a composite containing resin and ferromagneto-optical material dispersed in the resin. The high-frequency field generator 5 works to apply a high-frequency field to the magneto-optical element 1. The impedance adjustor 6 works to adjust the electrical impedance of the high-frequency field generator 5. The magneto-optical modulator 150 is responsive to an electric signal (i.e., a high-frequency modulating signal) inputted from a high-frequency generator 7 to modulate the light transmitted through the optical fiber 8 as a function of the high-frequency modulating signal. The modulated light is outputted through an optical fiber 9 and converted in an optical receiver 102 into an electric signal, which is, in turn, demodulated through an amplifier and a signal processing circuit (not shown).

Figure 10:
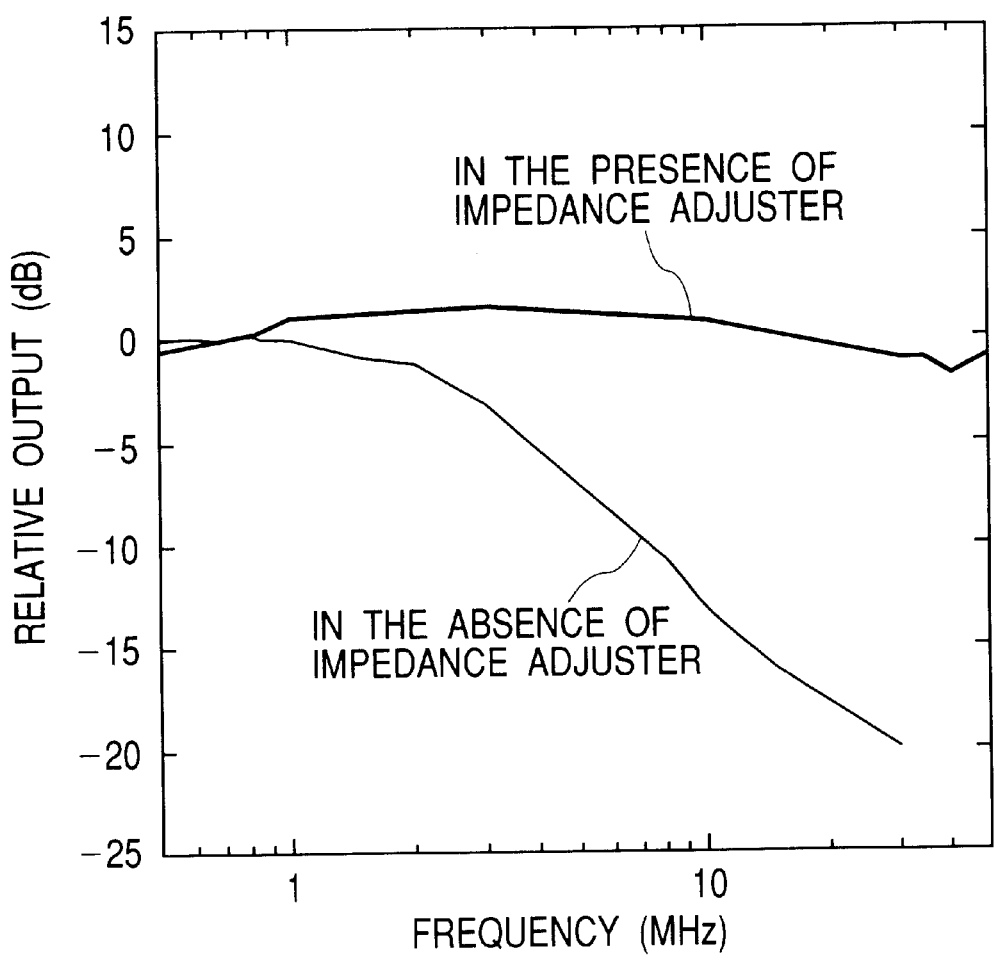
FIG. 10 is a graph which shows frequency response characteristics of a magneto-optical element of the first embodiment in the presence and absence of an impedance adjuster.

The impedance adjustor 6 works to adjust the impedance of the high-frequency field generator 5 so as to establish effective transmission of the signal from the high-frequency generator 7 to the high-frequency field generator 5. FIG. 10 shows comparison between the presence and absence of the impedance adjuster 6. In the illustrated cases, the high-frequency field generator 5 is made up of 16 to several tens of turns of wire around the magneto-optical element 1. In the absence of the impedance adjuster 6, the magneto-optical modulator 150 works to modulate an input signal only at low-frequencies lower than approximately 1 MHz and thus fails to function as an optical modulator at frequencies higher than several MHz. This is because the high-frequency field generator 5 usually has a great inductance to preclude a high-frequency current from flowing therethrough. This frequency characteristic is not improved in the absence of the impedance adjuster 6 even if a dc bias field, as will be discussed below, is applied to the magneto-optical element 1.

The effects of applying a dc bias field to the magneto-optical element 1 will be discussed with reference to FIGS. 8 and 9. Usually, in the absence of the dc bias field, ferrimagnetic materials and ferromagnetic materials such as ferrites, garnets, or transition metals keep a multi-domain structure. In particular, magneto-optical materials such as ferrites and garnets exhibit the resonance with movement of domain walls at a frequency that is between several tens and several hundreds MHz and close to a modulating frequency used in typical optical signal transmission systems. It is believed in the art that it is impossible to use such magneto-optical materials for a magneto-optical modulator employed in optical signal transmission systems. We have, however, found that the application of a dc bias field to the magneto-optical material will result in a decreased number of magnetic domains of the material, and the application of the dc bias field up to a saturation field of the material will result in the formation of a monodomain structure, thereby decreasing or eliminating the adverse effect of the resonance with the movement of domain walls on the modulation.

Figure 8:
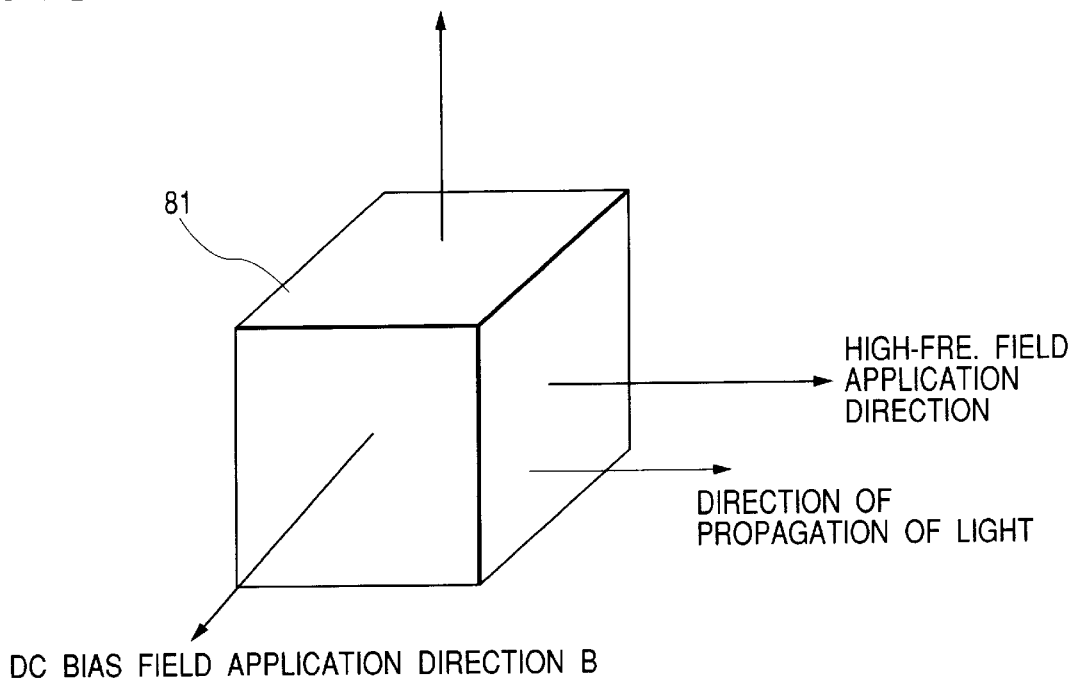
FIG. 8 is a perspective view which shows directions of application of a dc bias field and a high-frequency field to a magneto-optical element used in the first embodiment of FIG. 1.

The case where the dc bias field is, as shown in FIG. 8, applied to the magneto-optical element 81 at a given angle (e.g., right angles) to the direction of application of the high-frequency field to the magneto-optical element 81 will be discussed below. Note that the dc bias field may be oriented in the dc field application direction A, as shown in the drawing, the dc field application direction B, or any direction on a plane including the dc field application directions A and B.

When the dc bias field is oriented perpendicular to the high-frequency field, a greater degree of modulation will be obtained, but the degree of modulation does not decrease greatly when the direction of the dc bias field lies within 90°±30° to the direction of application of the high-frequency field. Specifically, a desired effect of the dc bias field is obtained when the direction thereof lies within that range.

The application of the dc bias field causes the magneto-optical element 81 to have a monodomain structure. Thus, when the high-frequency field is applied to the magneto-optical element 81, the resonance with the movement of domain walls whose resonance frequency is within a range of several tens to several hundreds MHz will not be produced. Further, the magneto-optical effect (i.e., optical modulation by the Faraday effect) may be kept properly until a ferromagnetic resonance frequency of the magneto-optical element 81 (several GHz to 100 GHz depending upon the strength of the bias field) is reached. Specifically, the magneto-optical modulator 150 works properly below the ferromagnetic resonance frequency. Additionally, when the direction in which the propagation of light is in parallel to the direction in which the high-frequency field is applied to the magneto-optical element 81, it will cause a component of the vector sum of the dc bias field and the high-frequency field extending parallel to the light to contribute the magneto-optical effect or modulation.

Accordingly, an optical signal transmission system capable of establishing high-frequency modulation of a beam of light may be realized by use of the magneto-optical modulator 150 designed to apply the dc bias field to the magneto-optical element 1 and input a high frequency signal to the high-frequency field generator 5.

The direction of propagation of the light needs not always be in parallel to the direction of application of the high-frequency field to the magneto-optical element 81. The influence of light reflecting from an end surface of the magneto-optical element 81 or ends of the optical fibers 8 and 9 is eliminated by shifting the direction of propagation of the light and the direction of application of the high-frequency field from each other within a range of ±15°.

Figure 9:
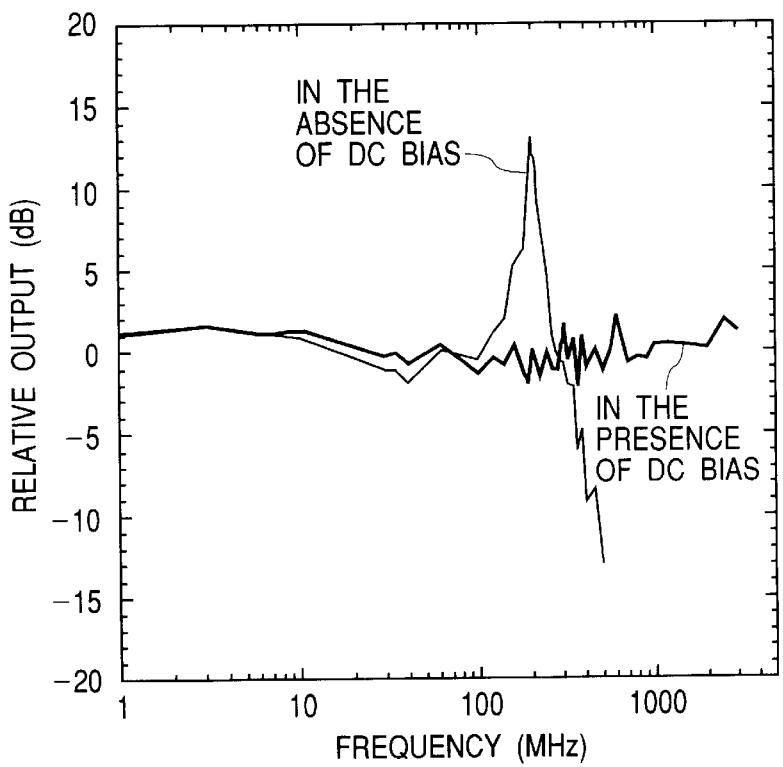
FIG. 9 is a graph which shows frequency response characteristics in the presence and absence of a dc bias field applied to a magneto-optical element used in the first embodiment of FIG. 1.

FIG. 9 shows frequency characteristics of the optical signal transmission system as shown in FIG. 1. The magneto-optical element 1 is made of a Bi-substituted garnet crystal film. In the absence of the dc bias field produced by the dc field generator 4, a modulated optical signal resonates at about 200 MHz with the movement of domain walls. Specifically, at a modulation frequencies above 200 MHz, the magneto-optical modulator 150 does not work properly. Alternatively, when the dc bias field is applied by the dc field generator 4 to the magneto-optical element 1, the frequency characteristics is improved. In particular, even when the dc bias field greater than or equal to the saturation filed of the magneto-optical element 1 is applied to the magneto-optical element 1, the magneto-optical modulator 150 works to establish the modulation up to about 3 GHz. Note that Hdc indicates the direction of application of the dc bias field throughout the drawings.

The direction of application of the high-frequency field to the magneto-optical element 81 may be oriented in the direction of an axis of easy magnetization thereof. Additionally, in a case where the magneto-optical element 81 has a length, application of the high-frequency field substantially in parallel to the length of the magneto-optical element 81 will cause the demagnetizing factor thereof to be minimized. This enables a higher degree of modulation of an optical signal to be produced easily under application of a lower degree of the high-frequency field.

The light source 101 may be made of a semiconductor laser, an LED (light-emitting diode), or a fiber laser. The optical fibers 8 and 9 may be made of a single-mode fiber, a polarization-maintaining fiber, a graded index fiber, or a large-diameter optical fiber. When the optical fiber 8 is implemented by the polarization-maintaining fiber, and the light source 101 is implemented by a light source such as a semiconductor laser emitting a linear polarized light, the direction of polarization of the light emitted from the light source 101 is kept constant until the light reaches the magneto-optical element 1, thus allowing the polarizer 2 to be omitted.

Figure 2:
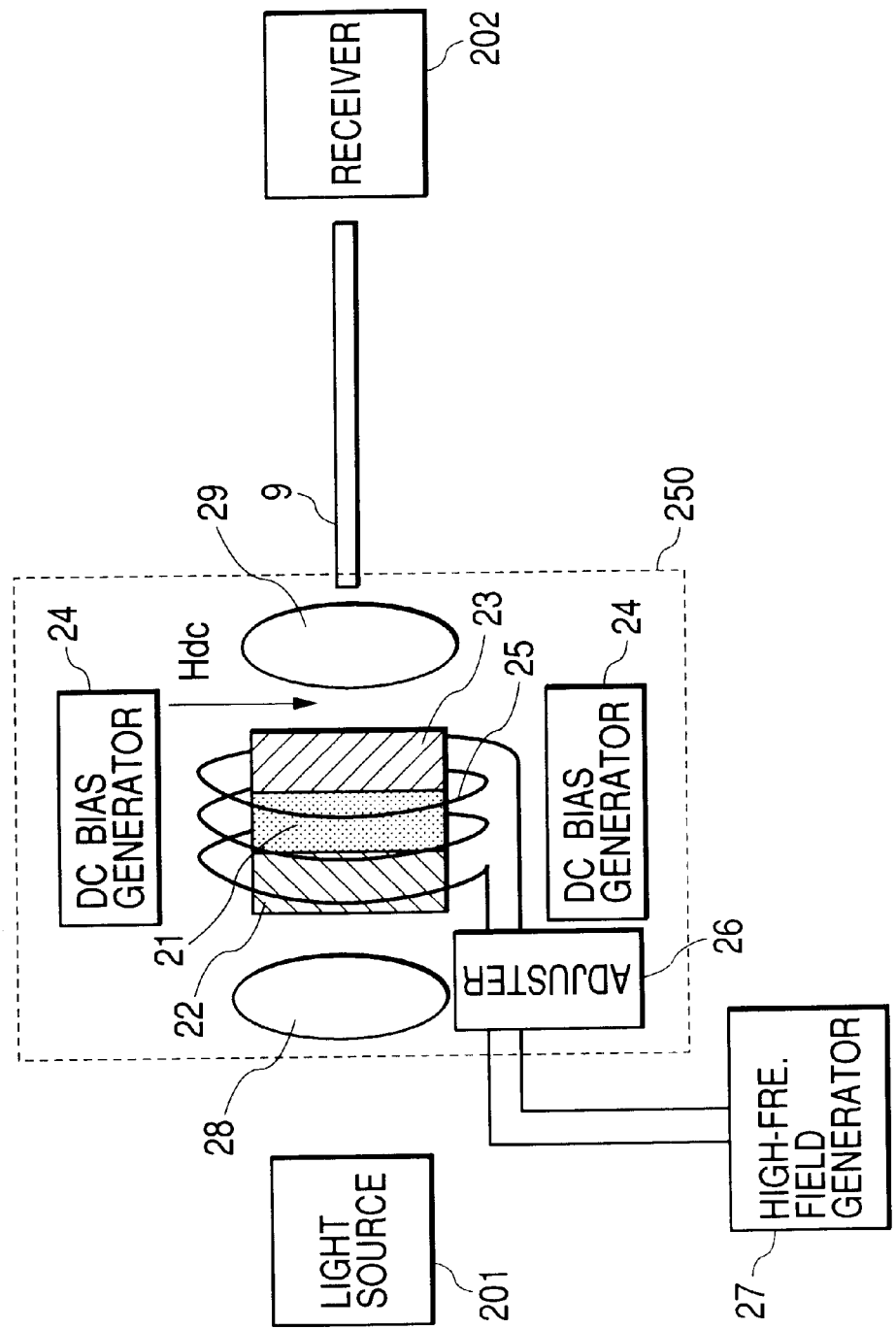
FIG. 2 is a block diagram which shows an optical signal transmission system equipped with a magneto-optical modulator according to the second embodiment of the invention

The second embodiment will be described below with reference to FIG. 2.

The light emitted from a light source 201 enters a lens 28 directly and reaches a polarizer 22. When the lens 28 is designed to produce parallel rays of light, it facilitates the ease of collection of the rays on an optical fiber 9, but rays of light outputted from the lens 28 need not always be parallel.

The light inputted to the polarizer 22 undergoes linear polarization and then enters an magneto-optical element 21 in which a plane of polarization thereof is rotated by the high-frequency field applied by a high-frequency field generator 25. The light then enters the analyzer 23 and is changed or modulated in intensity as defined by the rotated plane of polarization. The modulated light enters the optical fiber 9 through a lens 29 and is transmitted to an optical receiver 202 in which it is converted into an electric signal, which is, in turn, demodulated through an amplifier and a signal processing circuit (not shown). A dc field generator 24, a high-frequency field generator 25, an impedance adjuster 26, and a high-frequency signal generator 27 are identical with the dc field generator 4, the high-frequency field generator 5, the impedance adjuster 6, and the high-frequency signal generator 7 in FIG. 1, and explanation thereof in detail will be omitted here.

Usually, the light produced by an LED may be modulated only up to 100 MHz by direct modulating of a driving current for the LED. The use of the magneto-optical modulator 250 of this embodiment, however, enables the light produced by the LED to be modulated at several GHz or more. The magneto-optical modulator 250 may, therefore, be employed in an optical signal transmission system in which a plurality of optical fibers are tangled, which causes optical noises to arise in an optical signal transmission line from multi-reflection of light from ends of the optical fibers.

The light source 201 may be implemented by a semiconductor laser producing a linear polarized light beam. In this case, matching the direction of a plane of polarization of the light produced by the light source 201 up with that of the polarizer 22 eliminates the need for the polarizer 22.

The third embodiment will be described below with reference to FIG. 3.

The light emitted from a light source 301 travels through an optical fiber 320 and is amplified in an optical amplifier 380. The amplified light travels through an optical fiber 321 and enters a magneto-optical modulator 350. The optical amplifier 380 may be implemented by an optical fiber amplifier or a semiconductor laser amplifier. In this embodiment, the optical fiber amplifier is used for producing an intensity output. A modulation signal is provided to the magneto-optical element 31 by a high-frequency signal generator 37 and an impedance adjuster 36 to modulate the input light. The light modulated in the magneto-optical modulator 350 is transmitted through an optical fiber 322 to an optical receiver 302 and converted into an electric signal, which is, in turn, demodulated through an amplifier and a signal processing circuit (not shown). Other arrangements are identical with those in FIG. 1, and explanation thereof in detail will be omitted here.

In this embodiment, the light source 301 may be made of an LED or a fiber laser whose output light is usually difficult to modulate at high speeds by modulating a driving current in the LED or a light pumping source in the fiber laser. The magneto-optical modulator 350 of this embodiment is capable of modulating the input light at speeds higher than several GHz. The use of the optical amplifier 380 enables transmission of a high-power high-speed modulated light, thus allowing an optical signal outputted from the optical fiber 9 to be distributed at a desired power to a plurality of optical receivers through branch fibers. While the possible number of the branch fibers depends upon the modulation frequency of the optical signal and the distance the optical fiber is transmitted, the use of the optical signal transmission system in FIG. 3 permits the optical signal to be distributed to 100 optical receivers located about 1 km away from the magneto-optical modulator 350.

Figure 3:
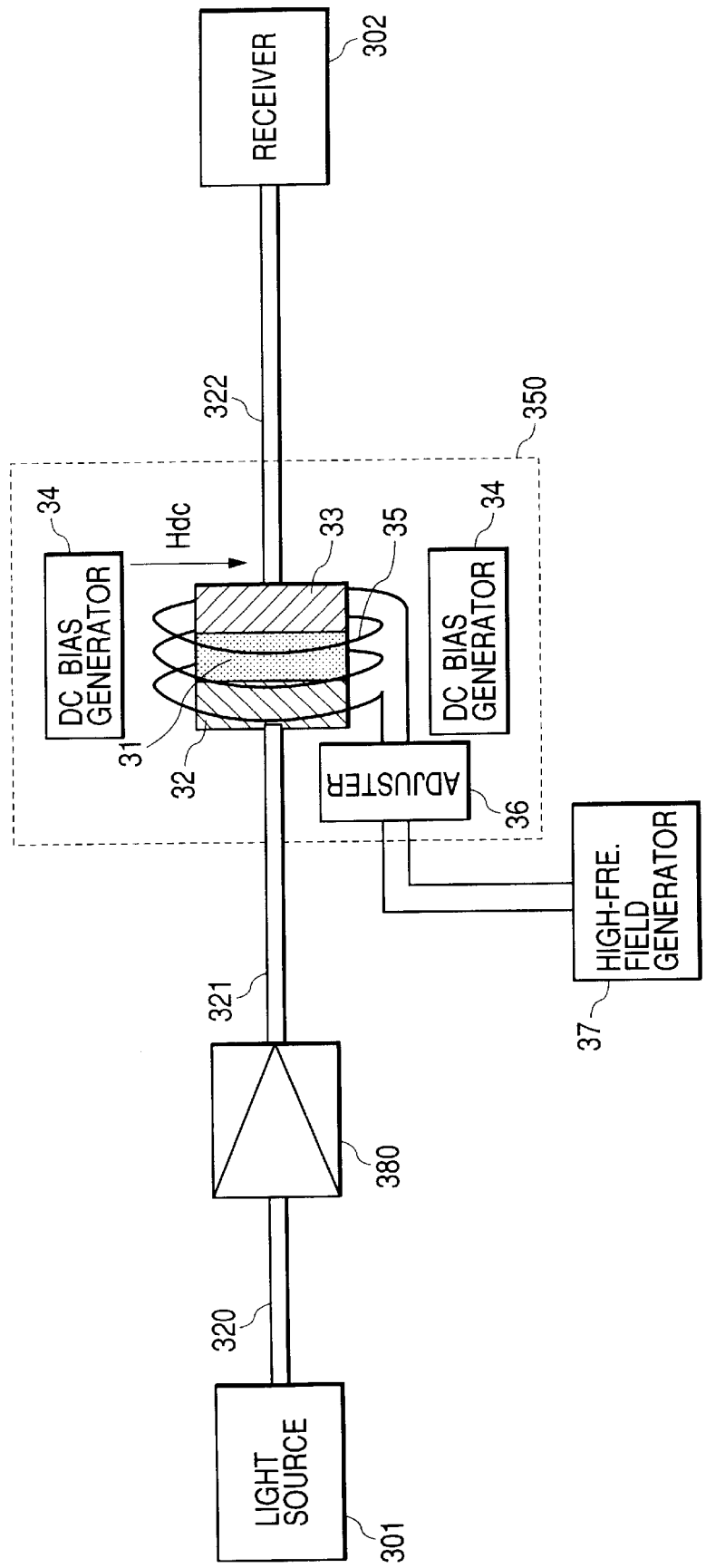
FIG. 3 is a block diagram which shows an optical signal transmission system equipped with a magneto-optical modulator according to the third embodiment of the invention

In FIG. 3, the magneto-optical modulator 350 is located behind the optical amplifier 380, but may be arranged immediately behind the light source 310 in terms of an S/N ratio.

The fourth to seventh embodiments will be discussed below with reference to FIGS. 4 to 7.

Figure 4:
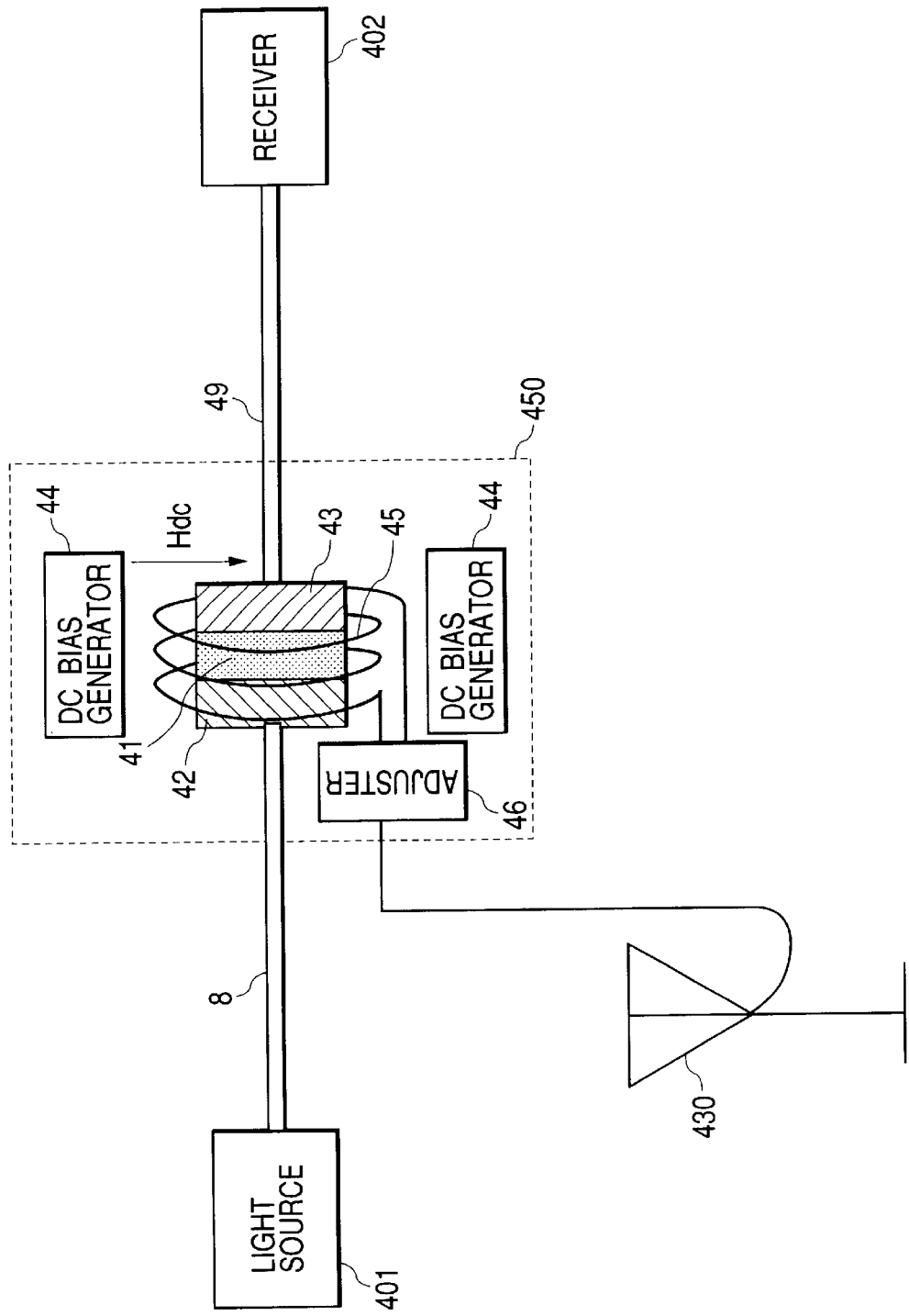
FIG. 4 is a block diagram which shows an optical signal transmission system equipped with a magneto-optical modulator according to the fourth embodiment of the invention

FIG. 4 illustrates an optical signal transmission system according to the fourth embodiment which is different from the first embodiment of FIG. 1 only in that an antenna 430 is used as a high-frequency signal generator. Other arrangements are identical, and explanation thereof in detail will be omitted here.

The antenna 430 receives a signal outputted from, for example, a radio base station of mobile phones or portable remote terminals and outputs it to the high-frequency field generator 45 through the impedance adjuster 46. The high-frequency field generator 45 produces a high-frequency field at 200 MHz or more. This enables the signal received by the antenna 430 to be carried on an optical signal inputted to the magneto-optical modulator 450 to the optical receiver 402. When a commercial power source is available, a high-frequency amplifier may be installed behind the antenna 430 and the impedance adjuster 46.

Figure 5:
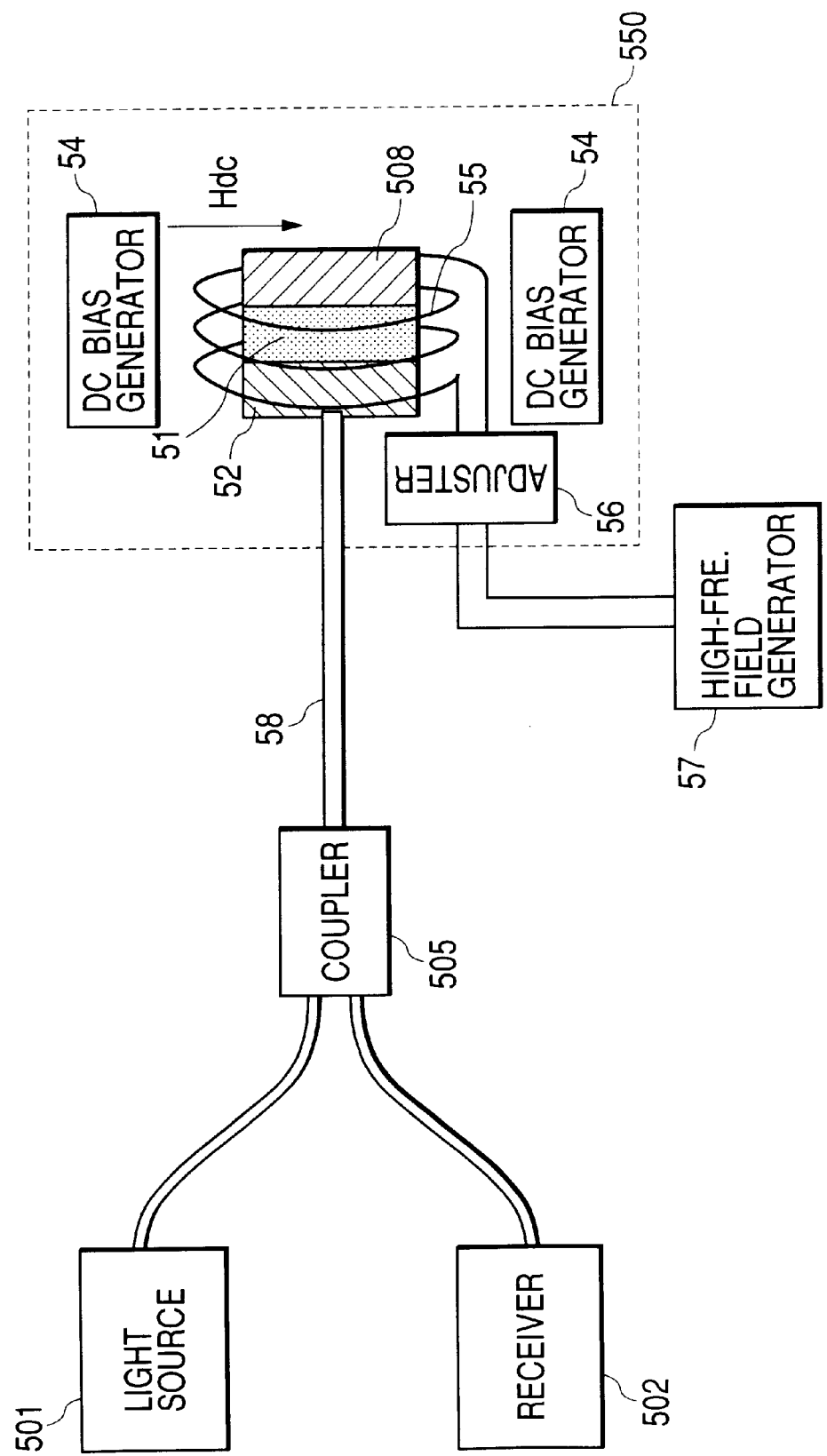
FIG. 5 is a block diagram which shows an optical signal transmission system equipped with a magneto-optical modulator according to the fifth embodiment of the invention

FIG. 5 illustrates an optical signal transmission system according to the fifth embodiment in which a reflective magneto-optical modulator 550 is used instead of a transmission magneto-optical modulator such as the one employed in each of the first to fourth embodiments. The use of the reflective magneto-optical modulator 550 permits a signal received by a high-frequency signal generator 57 made of an antenna to be carried to an optical receiver 502 through a single optical fiber 58. This results in a decrease in manufacturing cost of the system.

The magneto-optical modulator 550 has a mirror 508 installed behind a magneto-optical element 51. An optical signal emerging from the magneto-optical element 51 is reflected by the mirror 508 and enters a polarizer 52 again so that it is modulated in intensity and outputted to the optical receiver 502 through a coupler 505. Specifically, the polarizer 52 also functions as an analyzer, which permits the modulated optical signal to be transmitted through the optical fiber 58 over several hundreds of meters to several tens of kilometers. The coupler 505 may be of a known type, and explanation thereof in detail will be omitted here.

Figure 6:
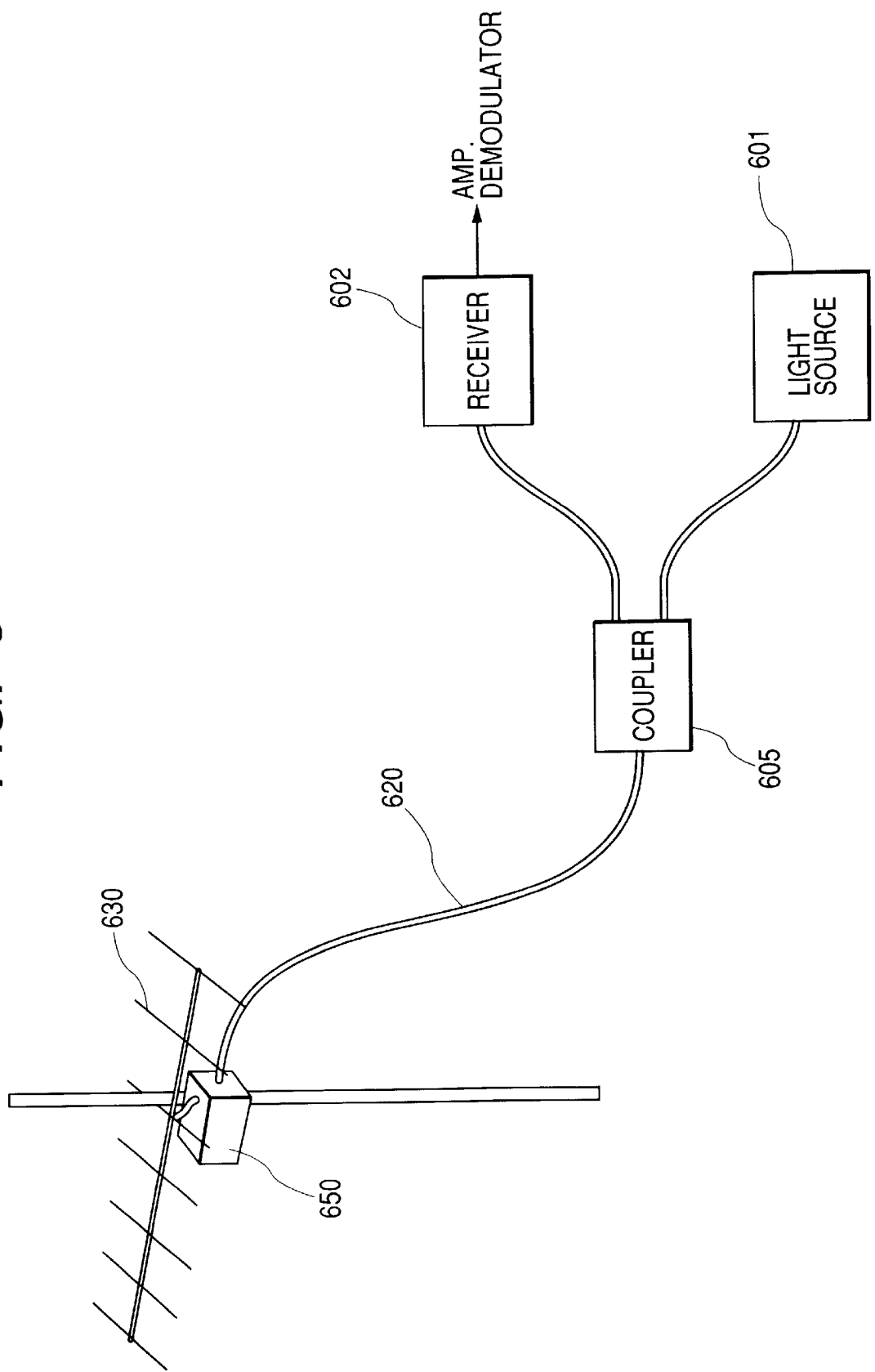
FIG. 6 is a block diagram which shows an optical signal transmission system equipped with a magneto-optical modulator according to the sixth embodiment of the invention

FIG. 6 illustrates an optical signal transmission system according to the sixth embodiment which is different from the fifth embodiment of FIG. 5 in that a Yagi antenna 630 is employed as a high-frequency signal generator working to provide a high-frequency modulation signal to a magneto-optical element. Other arrangements are identical with those in FIG. 5, and explanation thereof in detail will be omitted here.

Figure 7:
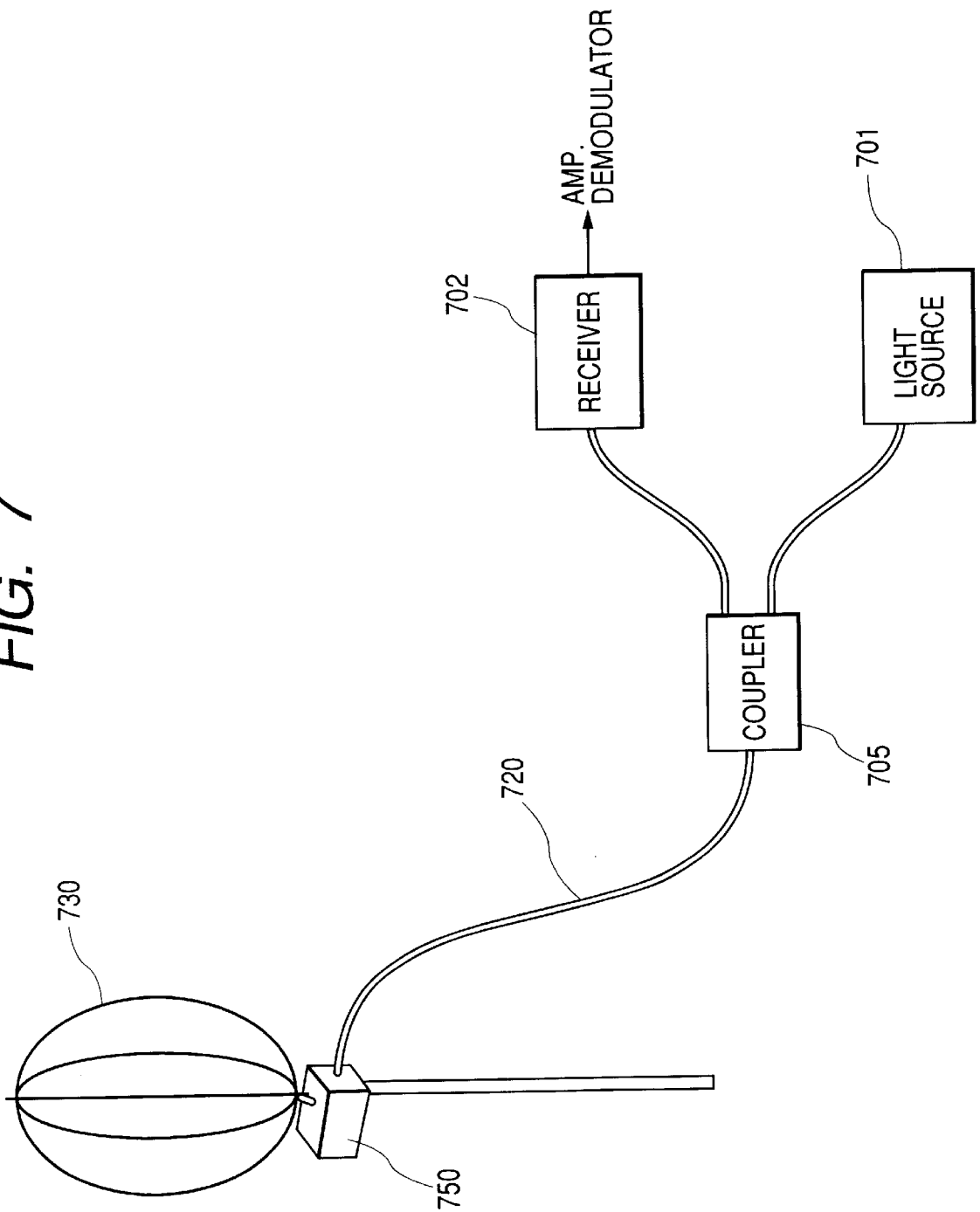
FIG. 7 is a block diagram which shows an optical signal transmission system equipped with a magneto-optical modulator according to the seventh embodiment of the invention

FIG. 7 illustrates an optical signal transmission system which uses a loop antenna 730 as a high-frequency signal generator. Other arrangement are identical with those in FIG. 6, and explanation thereof in detail will be omitted here. The use of the loop antenna 730 results in a decrease in antenna impedance, which facilitates ease of impedance matching with a current driven magneto-optical modulation element. A parabola antenna or a horn antenna may alternatively be employed.

Figure 11:
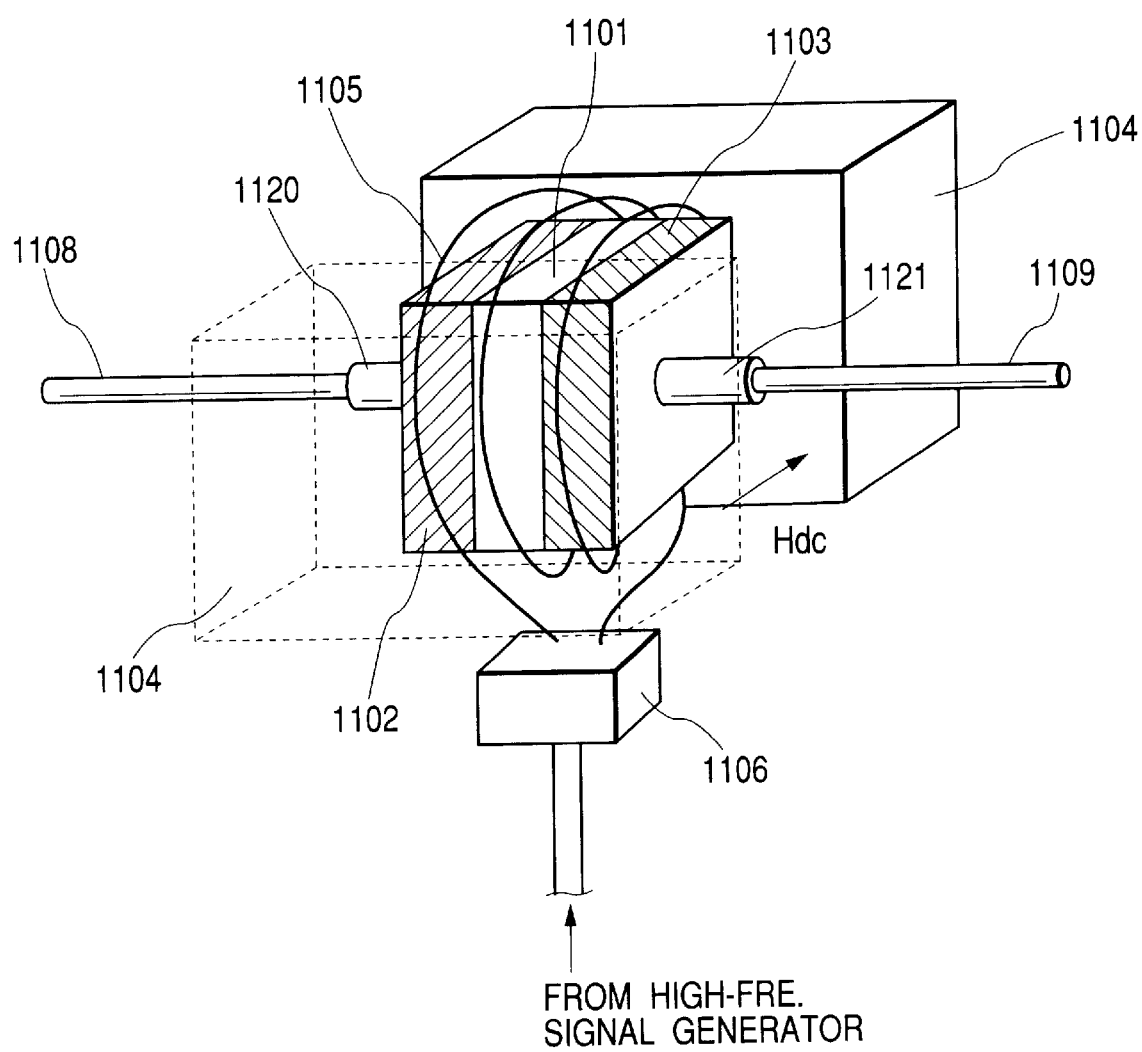
FIG. 11 is a block diagram which shows a magneto-optical modulator according to the eighth embodiment of the invention.

FIG. 11 shows an optical signal transmission system equipped with a magneto-optical modulator according to the eighth embodiment of the invention.

The light emitted from a light source travels through an optical fiber 1108 and is converted in a lens 1120 into a parallel beam of light. The light emerging from the lens 1120 passes through a polarizer 1102 and is linear polarized. The linear polarized light enters a magneto-optical element 1101 so that a plane of polarization is rotated by a high-frequency field produced by a high-frequency field generator 1105, after which it passes through an analyzer 1103 and is modulated in intensity as a function of the rotation of the plane of polarization. The intensity-modulated light is converged by a lens 1121 on an end of an optical fiber 1109 for transmission to an optical receiver (not shown).

The lens 1120 works to guide the light transmitted through the optical fiber 1108 onto the polarizer 1102 effectively. The lens 1121 works to guide the output of the analyzer 1103 onto the optical fiber 1109 effectively. If, however, the polarizer 1102, the magneto-optical element 1101, and the analyzer 1103 are made to be small in thickness, resulting in a decreased optical loss, the lenses 1120 and 1121 may be omitted. Thinning the polarizer 1102 may be accomplished by making it of polarizing glass, a lamination of metal and dielectric layers, any crystal having a higher birefringence, or a polarized light separating element such as a polarization splitter consisting of multiple layers made of a higher refractive material and a lower refractive material. Thinning the magneto-optical element 1101 may be accomplished by making it of a Bi-substituted garnet crystal film.

The dc field generator 1104 is identical in structure and operation with the ones in the above embodiments. Specifically, the dc field generator 1104 works to apply a dc bias field to the magneto-optical element 1101 to alleviate or eliminate the influence of a multi-domain structure of the magneto-optical element 1101 on the modulation. The direction of application of the dc bias field, as indicated by Hdc in the drawing, to the magneto-optical element 1101 is not limited in principle, but when it coincides with the direction of application of the high-frequency field applied by the high-frequency field generator 1105 to the magneto-optical element 1101, it may disenable the modulation or result in failure in producing a desired degree of modulation. It is, thus, advisable that the dc bias field be oriented within a range of 90°±30° to the direction of application of the high-frequency field. The magnitude of the dc bias field is enough to decrease the number of domain walls of the magneto-optical element 1101, but however, the dc field generator 1104 in this embodiment applies the dc bias field slightly greater than the saturation field of the magneto-optical element 1101 to the magneto-optical element 1101 to have a monodomain structure.

The impedance adjuster 1106 is, like the above embodiments, designed to modify the impedance of the high-frequency field generator 1105 so as to enhance the conversion of a high-frequency signal from a high-frequency signal generator (not shown) into the high-frequency field for establishing the modulation at a desired frequency.

It is advisable that the direction of application of the high-frequency field to the magneto-optical element 1101 be oriented in the direction of an axis of easy magnetization, that is, the direction substantially perpendicular to the Bi-substituted garnet crystal film of the magneto-optical element 1101, thereby enabling a higher degree of modulation of an optical signal to be established under application of a lower degree of the high-frequency field.

The use of the dc bias field and the impedance adjuster 1106, like the above embodiments, enables an optical signal to be modulated at frequencies higher than 200 MHz.

The high-frequency field generator 1105 is implemented by a coil. For example, in cases where the coil has 50 turns, 15 turns, 5 turns or less, and one turn, the magneto-optical modulator of this embodiment works to modulate the optical signal up to 200 MHz, 1 GHz, 3 GHz, and 10 GHz, respectively.

An optical signal transmission system according to the ninth embodiment will be discussed below which is different from the one shown in FIG. 11 only in internal structure of the impedance adjuster 1106. Other arrangements are identical, and explanation thereof in detail will be omitted here.

Figure 12:
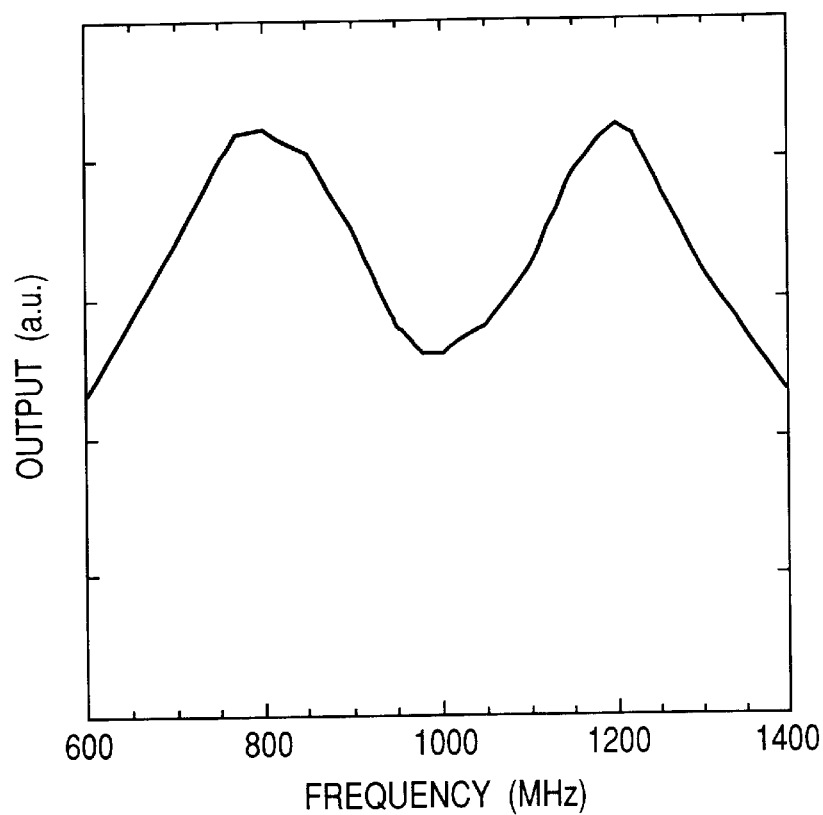
FIG. 12 is a graph which shows an example of frequency characteristics of a magneto-optical modulator according to the ninth embodiment of the invention.
Figure 13:
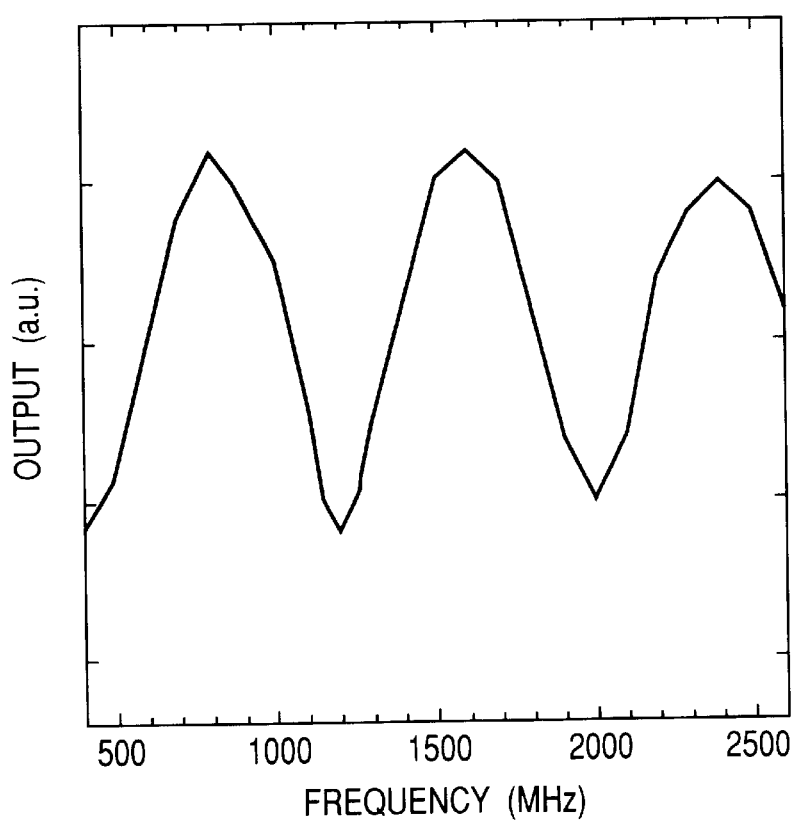
FIG. 13 is a graph shows another example of frequency characteristics of a magneto-optical modulator according to the ninth embodiment of the invention.

The impedance adjuster 1106 is designed to perform a resonating function or a filtering function which serves to establish a greater degree of modulation at specific frequencies. The impedance adjuster 1106 may be implemented by a resonant circuit containing inductance and capacitance so arranged that the circuit is capable of resonance at given frequencies or a filter allowing signals of given frequencies to pass therethrough. FIG. 12 illustrates for the case where resonance frequencies are 0.8 GHz and 1.2 GHz. FIG. 13 illustrates for the case where resonance frequencies are 0.8 GHz, 1.6 GHz, and 2.4 GHz. The use of the impedance adjuster 1106 delimits a modulation band, but produces a greater degree of modulation at a central frequency of the modulation band. In this embodiment, the degree of modulation is increased by approximately 5 to 10 dB or more as compared with when the impedance adjuster 1106 is so designed as to hardly resonate.

Figure 14:
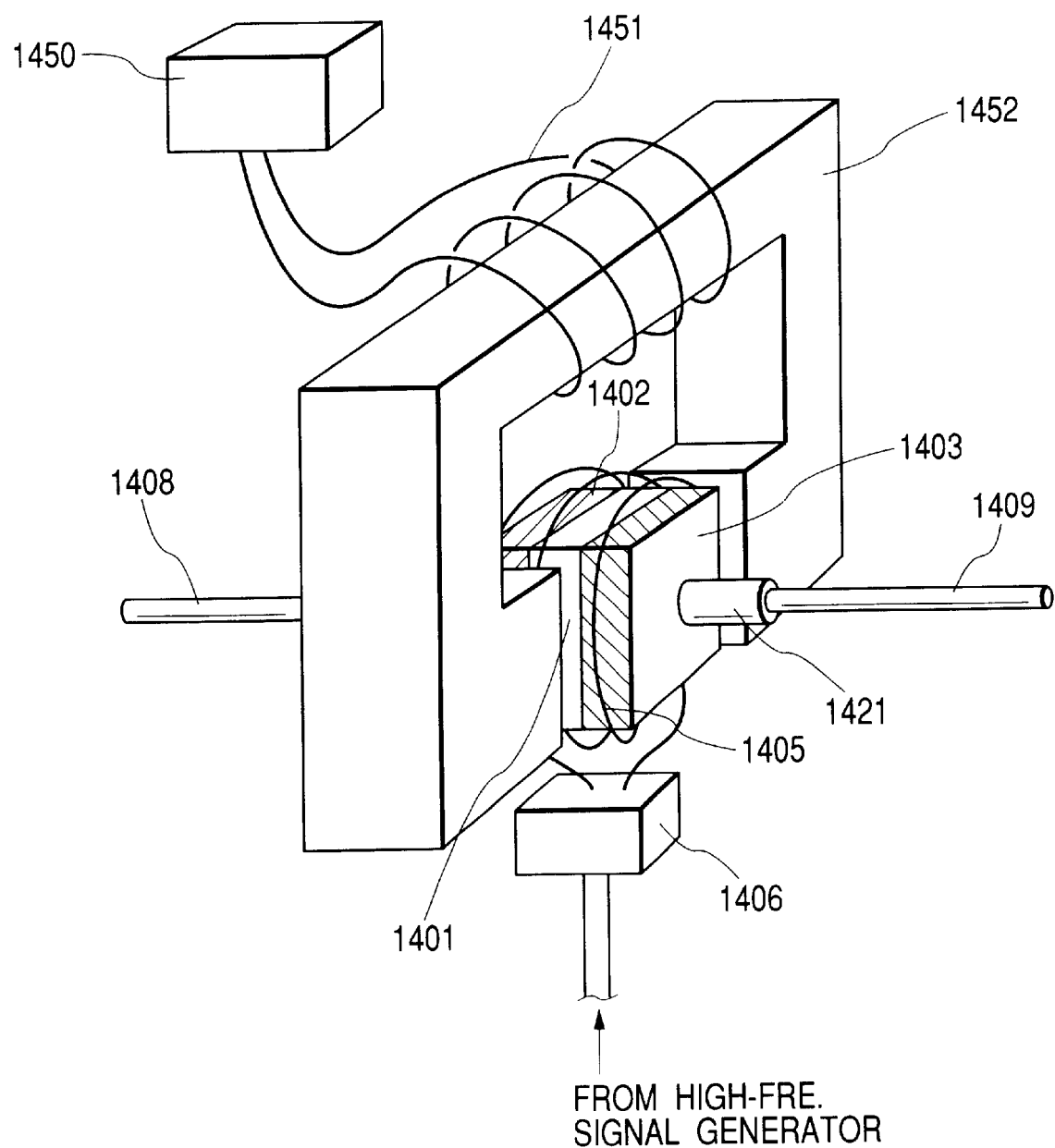
FIG. 14 is a block diagram which shows a magneto-optical modulator according to the tenth embodiment of the invention.

FIG. 14 shows an optical signal transmission system according to the tenth embodiment of the invention which is different from the ninth embodiment of FIG. 11 only in structure of a dc field generator. Other arrangements are identical, and explanation thereof in detail will be omitted here.

The dc field generator consists of a dc generator 1450, a dc field generating coil 1451, and a soft magnetic core 1452 shaped to close a magnetic circuit. The dc field generating coil 1451 is made up of approximately 500 turns of wire. The dc generator 1450 is designed to change the value of current supplied to the dc field generating coil 1451 as needed and works to adjust the magnitude of the dc bias field produced by the dc field generating coil 1451 within a range of 0 to 1 tesla (i.e., 0 to 10000 gauss), thereby enabling the magnitude of the dc bias field to be matched with the kind of material of the magneto-optical element 1401. Specifically, it is possible to control the dc bias field only by adjusting the value of current provided by the dc generator 1450 to the dc field generating coil 1451, thereby compensating for a change in magnitude of the dc bias field caused by a change in ambient temperature.

Figure 15A:
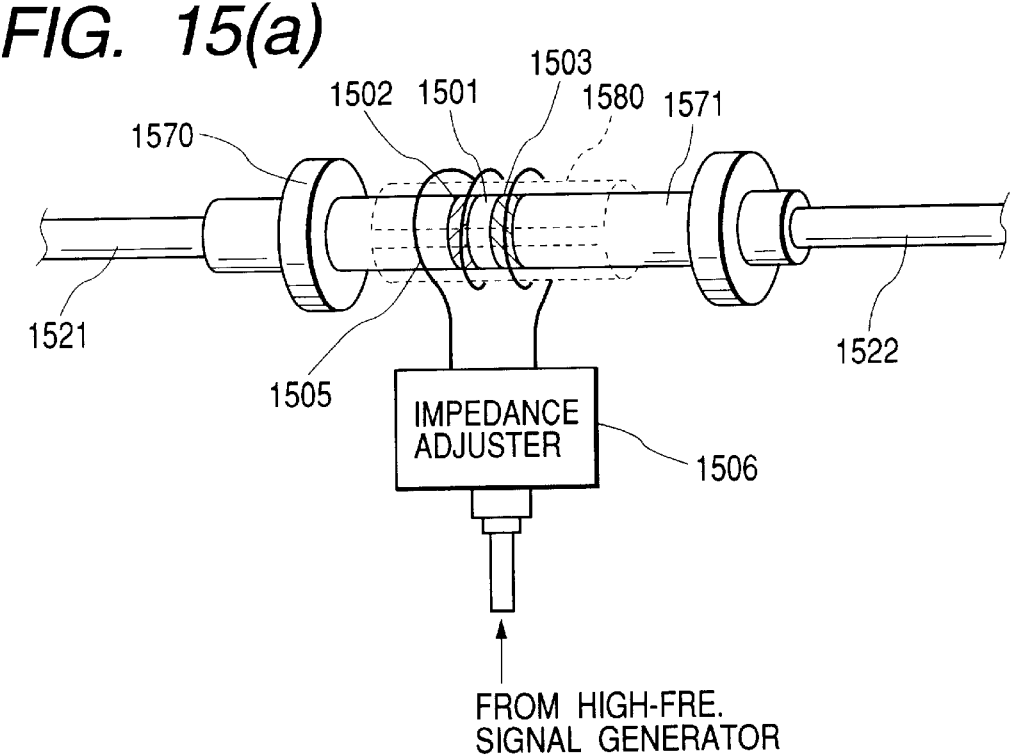
FIG. 15(a) is a perspective view which shows a magneto-optical modulator according to the eleventh embodiment of the invention from which a dc field generator is removed.
Figure 15B:
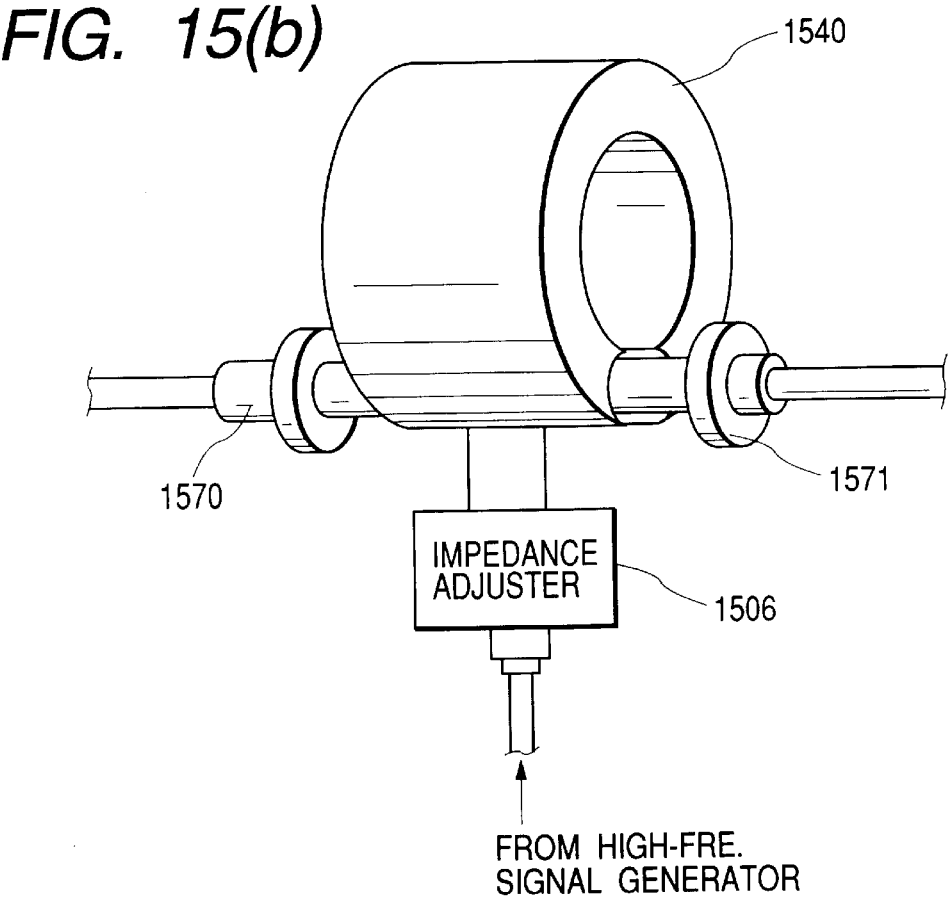
FIG. 15(b) is a perspective view which shows a magneto-optical modulator of the eleventh embodiment.

FIGS. 15(a) and 15(b) show a magneto-optical modulator according to the eleventh embodiment of the invention in which two ferules 1570 and 1571 are disposed outside a polarizer 1502, a magneto-optical element 1501, and an analyzer 1503. FIG. 15(a) illustrates the magneto-optical modulator from which a dc field generator 1540 is removed.

The light transmitted through an optical fiber 1521 enters an magneto-optical modulator assembly consisting of the ferules 1570 and 1571, the polarizer 1502, the magneto-optical element 1501, and the analyzer 1503. The polarizer 1502, the magneto-optical element 1501, and the analyzer 1503 are joined using adhesive in the form of a chip without lenses. The chip is interposed between end surfaces of the ferules 1570 and 1571, joined or glued therewith, and clamped tightly by a split sleeve 1580, as indicated by a broken line for ease of visibility of the inside of the split sleeve 1580.

The ferules 1570 and 1571 and the split sleeve 1580 are each made of a non-magnetic and non-metallic material such as ceramic, glass, resin, or mixture of various fillers and resin which does not produce the eddy current upon application of a high-frequency field. The high-frequency field generator 1505 is, like the above embodiments, coupled through the impedance adjuster 1506 to a high-frequency signal generator (not shown) which is identical in structure with the one in each of the above embodiments.

The dc field generator 1540, as shown in FIG. 15(b), is made of a hollow cylindrical permanent magnet which has formed therein a slit to define magnetic pole faces between which the magneto-optical modulator assembly is installed. Specifically, the dc field generator 1540 is so designed as to produce a magnetic circuit substantially closed except for the slit. The dc field generator 1540 of this embodiment is capable of producing a relatively strong dc bias field to be applied to the magneto-optical element 1501 as compared with the dc field generator 1104 made of permanent magnets shown in FIG. 11. It is also possible to reduce the size of the dc field generator 1540 while keeping the magnitude of the dc bias field at a level substantially equal to that in the dc field generator 1104 of FIG. 11. Further, the use of the closed magnetic circuit results in a decrease in demagnetizing factor, which ensures the thermal stability of the dc bias field and keeps the magnitude of the dc bias field constant for a long period of time. This results in improved reliability of the magneto-optical modulator.

The magneto-optical modulator of this embodiment works to modulate an optical signal up to 5 GHz. When it is required to minimize or eliminate the reflection of light from the end surfaces of the ferules 1570 and 1571, the end surfaces of the ferules 1570 and 1571 may be polished at an angle of approximately 15° or less to longitudinal center lines thereof and/or ends of the polarizer 1502, the magneto-optical element 1501, and the analyzer 1503 may be coated with a nonreflective coating, the magneto-optical element 1501, and the analyzer 1503 together. The use of the ferules 1570 and 1571 having the end surfaces inclined and polished, the polarizer 1502, the magneto-optical element 1501, and the analyzer 1503 having the nonreflectively coated ends results in a decrease in magnitude of the light returned to the light source to −40 dB or less. In a case of an inexpensive semiconductor laser source constructed to output a laser beam which is difficult to modulate at high speeds by direct modulation, we have observed that there is no optical fluctuation arising from reflection of the laser beam from the magneto-optical modulator assembly and that the laser beam may be modulated up to 5 GHz.

Other arrangements are identical with those in the above embodiments. The magneto-optical modulator of this embodiment may be used with any of the optical signal transmission systems as described above.

Figure 16:
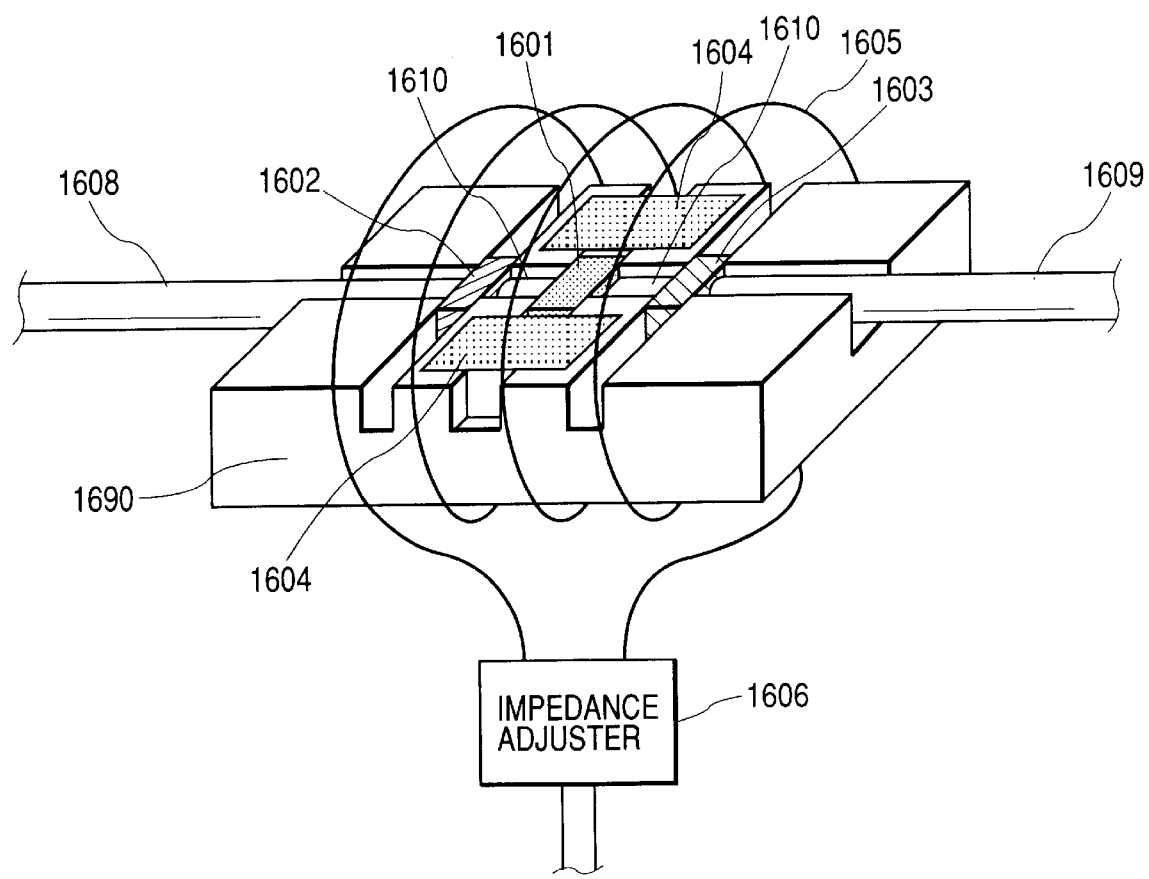
FIG. 16 is a block diagram which shows a magneto-optical modulator according to the twelfth embodiment of the invention.

FIG. 16 shows a magneto-optical modulator according to the twelfth embodiment of the invention in which a polarizer 1602, a magneto-optical element 1601, an analyzer 1603, and a dc field generator 1604 are fabricated in a single substrate 1690.

The substrate 1690 is, as can be seen from the drawing, formed with a rectangular plate made of a non-magnetic material such as resin, a resin-filler composite, a ceramic material, or glass. In this embodiment, the substrate 1690 is made of a glass epoxide that is one of resin-filler composites which are easy to machine by a precision diamond saw (also called a dicing saw). The substrate 1690 has two recesses or chamber formed in a central portion of a surface thereof for installation of magnets of a dc field generator 1604 and a groove extending horizontally, as viewed in the drawing, for installation of optical fibers 1608 and 1609. The installation of the polarizer 1602, the magneto-optical element 1601, the analyzer 1603, and the optical fibers 1608 and 1609 in the substrate 190 is accomplished by, after the magnet-installation chamber and the optical fiber installation groove are formed, fitting a single optical fiber in the optical fiber installation groove, machining three grooves using the precision diamond saw in the surface of the substrate 1690 in a direction traversing the optical fiber to divide the optical fiber into four parts: the optical fibers 1602, 1610, and 1609, and fitting the polarizer 1602, the magneto-optical element 1601, the analyzer 1603, and the magnets of the dc field generator 1604 in central portions of the three grooves and the magnet-installation chambers, respectively. The magneto-optical modulator of this embodiment may, therefore, be made in mass production without need for adjustment of an optical axis.

The magnets of the dc field generator 1604 are, for example, ferrite permanent magnets which do not produce the eddy current within a high-frequency field produced by the high-frequency field generator 1605.

The impedance adjuster 1606 is identical in structure with the ones of the above embodiments and disposed outside the substrate 1690, but may be fabricated in the substrate 1690.

The dc field generator 1604 may alternatively be disposed outside the high-frequency field generator 1605, thereby avoiding generation of the eddy current caused by application of the high-frequency field. The dc field generator 1604 may, therefore, be implemented by permanent magnets made of Sm—Co based metal or an Nd—Fe—B based metal.

The magneto-optical modulator of this embodiment may be used with any of the optical signal transmission systems as described above.

Figure 17A:
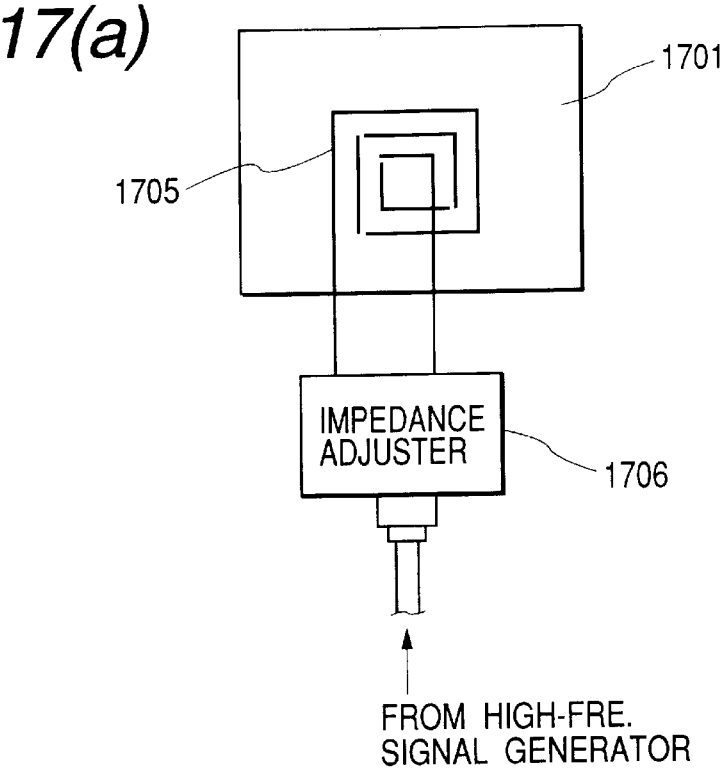
FIG. 17(a) is a front view which shows a structure of a high-frequency field generator installed in a magneto-optical modulator according to the thirteenth embodiment of the invention.
Figure 17B:
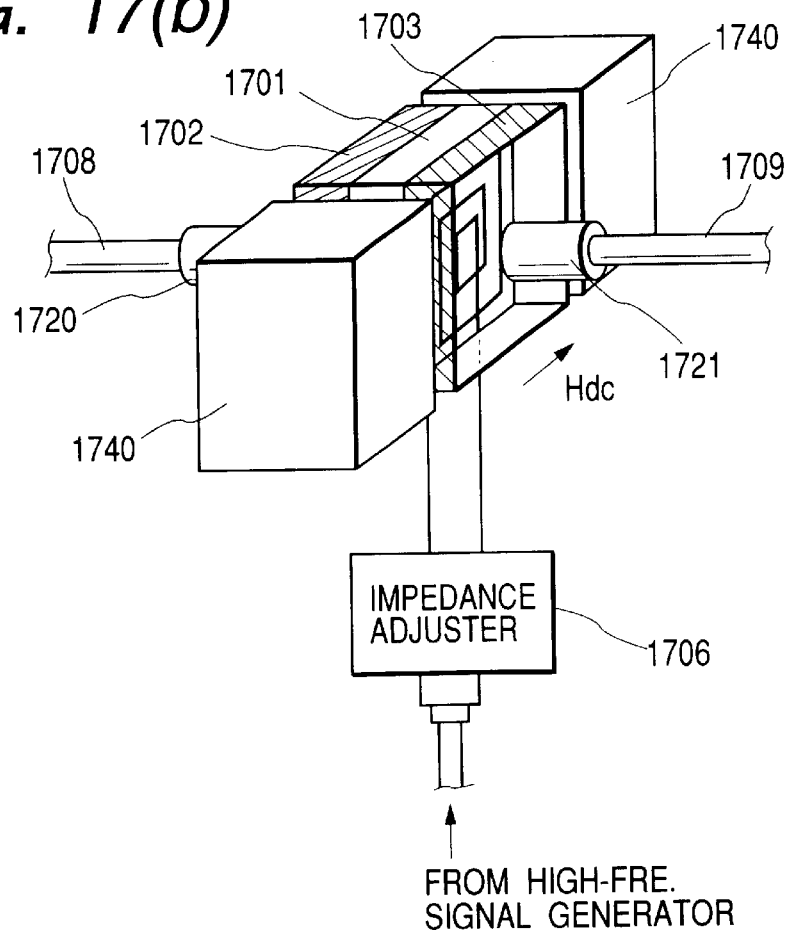
FIG. 17(b) is a perspective view which shows a magneto-optical modulator according to the thirteenth embodiment of the invention.

FIGS. 17(*a*) and 17(*b*) show a magneto-optical modulator according to the thirteenth embodiment of the invention.

A high-frequency field generator 1705 is installed on a magneto-optical element 1701. Specifically, the high-frequency field generator 1705 is made of a coil formed on a surface of the magneto-optical element 1701 using exposure and etching techniques. The inner diameter of the coil is preferably within a range of 10 $\mu$m to 100 $\mu$m for converging light emerging from an optical fiber 1708 if implemented by a single mode fiber. If the optical fiber 1708 is implemented by a multi-mode fiber (e.g., a graded index optical fiber) or a large-diameter optical fiber, the inner diameter of the coil is preferably between 100 $\mu$m to 1000 $\mu$m. The magneto-optical element 1701 is formed by a $(BiGdYLa)_3(FeGa)_5O_{12}$ crystal film. The axis of easy magnetization of this garnet crystal film is oriented perpendicular to end surfaces thereof for ensuring a response to application of a low-level high-frequency field thereto. The optical fiber 1709, like the optical fiber 1708, may be made of a single mode fiber, a multi-mode fiber such as the graded index optical fiber, or a large-diameter optical fiber.

A polarizer 1702 and an analyzer 1703 are, as clearly shown in FIG. 17(*b*), attached to opposite surfaces of the magneto-optical element 1701. The light transmitted through the optical fiber 1708 is converged by a lens 1720 so as to form a minimum possible beam of light on the magneto-optical element 1701. The polarizer 1702 linear-polarizes the light inputted from the lens 1720. The linear polarized light passes through the magneto-optical element 1701 and a central portion of the high-frequency field generator 1705. When a minimum inner diameter of the central portion of the high-frequency field generator 1705, that is, the length of a shorter side of the innermost turn of the coil is between 10 $\mu$m and 100 $\mu$m, it allows the diameter of a beam passing through the optical fibers 1708 and 1709 made of a single mode optical fiber to be smaller than that minimum inner diameter, thereby establishing effective modulation of the light.

The strength of the field developed at the center of the high-frequency field generator 1705 is inversely proportional to the inner diameter of the high-frequency field generator 1705. Thus, if the value of current flowing through the high-frequency field generator 1705 is constant, the degree of modulation produced by the magneto-optical element 1701 increases with an decrease in inner diameter of the high-frequency field generator 1705.

After passing through the magneto-optical element 1701, the light is modulated in intensity by the analyzer 1703 as a function of rotation of a plane of polarization thereof and then enters the optical fiber 1709 through a converging lens 1721.

The dc field generator 1740 is implemented by Nd—Fe—B permanent magnets which work to apply a dc bias field to the magneto-optical element 1701 in parallel to end surfaces thereof.

The impedance adjuster 1706 is identical in structure with the ones in the above embodiments and works to adjust the impedance of the high-frequency field generator 1705 for ensuring effective transmission of a high-frequency signal from a high-frequency signal generator (not shown) to the high-frequency field generator 1705. The high-frequency signal generator is identical in structure with the ones in the above embodiments, and explanation thereof in detail will be omitted here.

The magneto-optical modulator of this embodiment is capable of modulating a carrier wave whose length is 1.31 $\mu$m or 1.55 $\mu$m up to 1 GHz. When the magneto-optical element 1701 is made of a $(BiGdYLa)_3(FeGa)_5O_{12}$ garnet crystal film having a thickness of 60 $\mu$m, an optical loss increases in excess of several dB, but it becomes possible to modulate the light in a band of 0.7 to 0.9 $\mu$m up to 1 GHz.

The magneto-optical modulator of this embodiment may be, like the twelfth embodiment, fabricated in a single substrate without use of the lenses 1720 and 1721. In this case, because of emission of the lenses 1720 and 1721, it becomes necessary to the inner diameter of the high-frequency field generator 1705. When a total thickness of the polarizer 1702, the magneto-optical element 1701, and the analyer 1703 is less than approximately 0.6 mm, a minimum inner diameter of the high-frequency field generator 1705 may lie within a range of 100 $\mu$m to 1000 $\mu$m.

Figure 18:
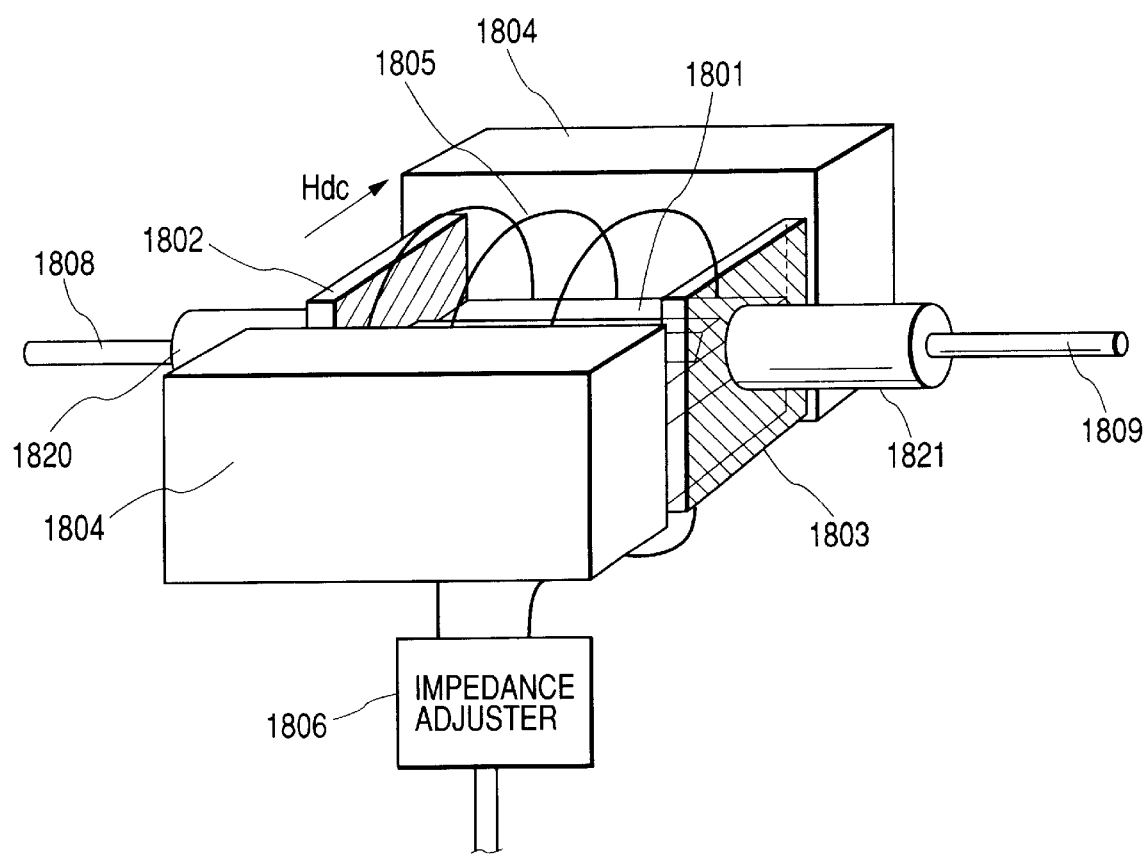
FIG. 18 is a block diagram which shows a magneto-optical modulator according to the fourteenth embodiment of the invention.

FIG. 18 shows a magneto-optical modulator according to the fourteenth embodiment of the invention in which a magneto-optical element 1801 is designed as an optical wave guide.

The magneto-optical element 1801 (i.e., the optical wave guide) has a length extending in a direction of propagation of an optical signal and is made of either of a single mode structure and a multi-mode structure. Usually, the degree of the magneto-optical effect or modulation is proportional to the length of a magneto-optical element through which the light passes. Thus, when a high-frequency field produced by a high-frequency field generator 1805 is constant in level, the longer the magneto-optical element 1801, the greater the degree of the magneto-optical effect. In a case where an optical beam is inputted at right angles to an input surface of the magneto-optical element 1801 which is made of a garnet crystal film, it is advisable that the length of the magneto-optical element 1801 be several $\mu$m or less. Similarly, in a case of a YIG $(Y_3Fe_5O_{12})$ bulk crystal, it is advisable that the length of the magneto-optical element 1801 be 5 to 10 mm. Further, forming the magneto-optical element 1801 made of, for example, $Y_3Fe_5O_{12}$, $(YGd)_3Fe_5O_{12}$, or $(TbY)_3Fe_5O_{12}$ on a non-magnetic garnet substrate made of, for example, $Gd_3Ga_5O_{12}$ using the liquid phase epitaxy permits the magneto-optical element 1801 to have a length of 10 to 30 mm extending parallel to a surface of the substrate.

The angle of rotation of a plane of polarization of the light having passed through the magneto-optical element 1801 is proportional to the length of the magneto-optical element 1801. The structure of this embodiment is capable of producing the degree of modulation which is several tens of times greater than usual and also permits the magneto-optical element 1801 to be narrow and long along the length of the optical wave guide. The direction of application of the high-frequency field to the magneto-optical element 1801 oriented substantially parallel to the length of the magneto-optical element 1801, thus, results in a decrease in demagnetizing factor of the magneto-optical element 1801, which permits the degree of the high-frequency field to be reduced as compared with the above embodiments. Similarly, in the above embodiments where the magneto-optical element has a length, a decrease in demagnetizing factor of the magneto-optical element may be achieved by applying the high-frequency substantially in parallel to the length of the magneto-optical element.

The structure of this embodiment enables the production of the magneto-optical modulator capable of producing a 10% degree of modulation up to 1 GHz.

The high-frequency field generator 1804 is, like the above embodiments, implemented by a coil wound around the magneto-optical element 1801. A polarizer 1802 and an analyzer 1803 are installed on ends or principal planes of the magneto-optical element 1801. Converging lenses 1820 and 1821 are disposed outside the polarizer 1802 and the analyzer 1803, respectively. Other arrangements are identical with those in the above embodiments, and explanation thereof in detail will be omitted here. The magneto-optical modulator of this embodiment may be used with any of the optical signal transmission systems as described above.

Figure 19A:
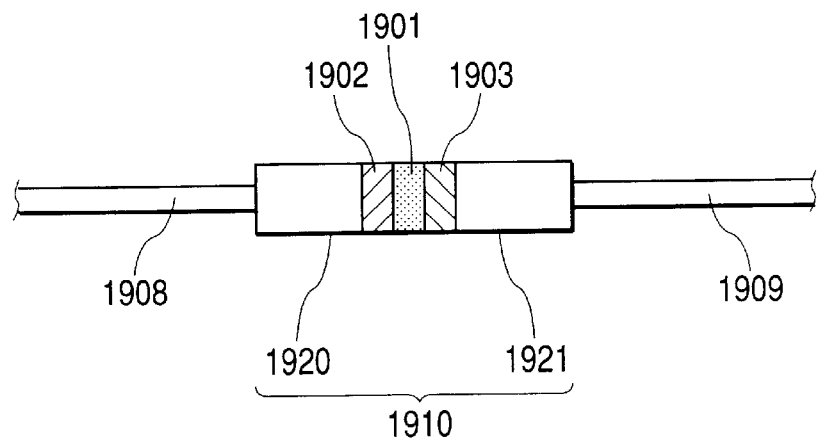
FIG. 19(a) is a plan view which shows an optical modulating device according to the fifteenth embodiment of the invention.
Figure 19B:
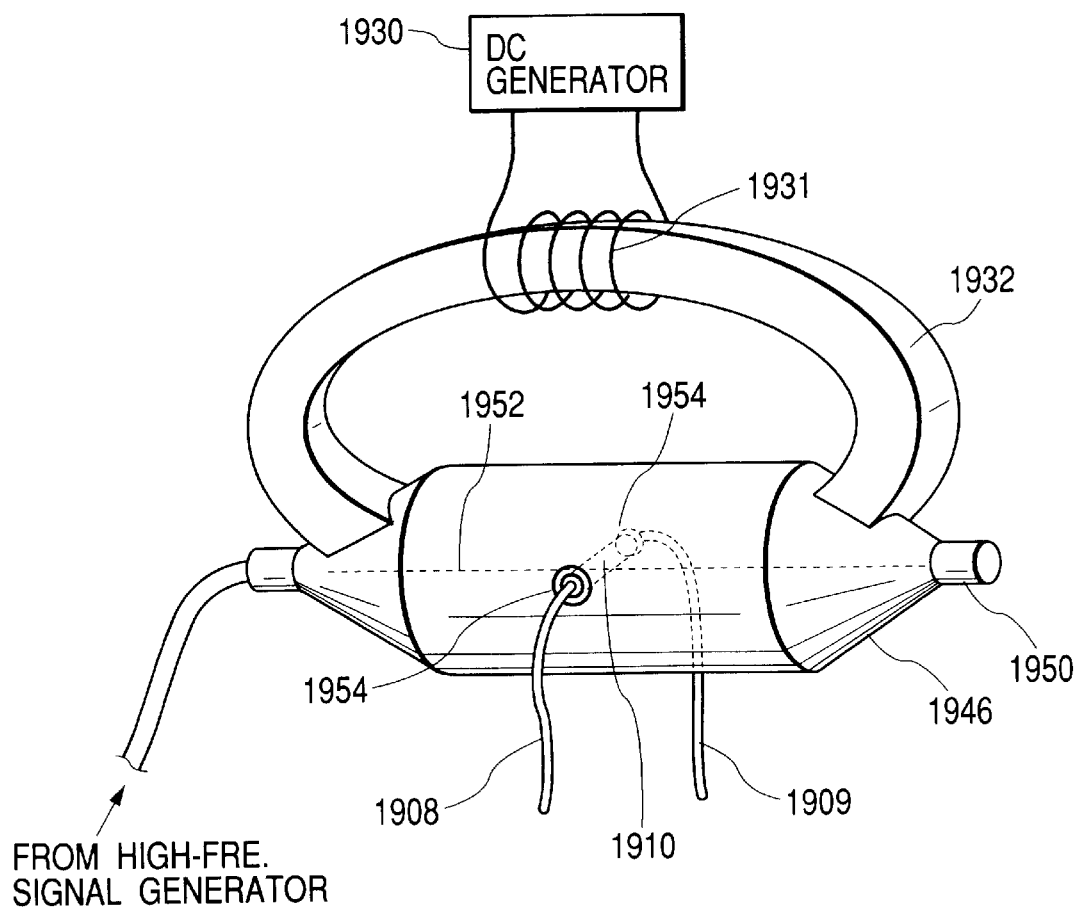
FIG. 19(b) is a perspective view which shows a magneto-optical modulator of the fifteenth embodiment.

FIGS. 19(*a*) and 19(*b*) show a magneto-optical modulator according to the fifteenth embodiment of the invention in which the high-frequency field generator and the impedance adjuster, as used in the above embodiments, are implemented by a transverse electromagnetic (TEM) cell.

The TEM cell used in this embodiment is, as shown in FIG. 19(*b*), a coaxial TEM cell having a hollow cylindrical body through which a conductor 1952, as indicated by a broken line in the drawing, extends on a longitudinal center line thereof. The hollow cylindrical body has end walls tapered for avoiding the reflection or attenuation of a high-frequency field within the hollow cylindrical body and retains therein an optical modulating device 1910.

The optical modulating device 1910 consists of, as clearly shown in FIG. 19(*a*), lenses 1920 and 1921, a polarizer 1902, a magneto-optical element 1901, and an analyzer 1903.

In operation, the light merging from an optical fiber 1908 is converted into a parallel beam of light in the lens 1920 and passes through the polarizer 1902 so that it is linear polarized. The linear polarized light is subjected to rotation of a plane of polarization by the magneto-optical element 1901 as a function of a high-frequency field applied thereto and then modulated in intensity by the analyzer 1921 as a function of the rotation of the plane of polarization. The light emerging from the analyzer 1903 enters the lens 1921 so that it is converged on an end of the optical fiber 1909. In a case where the polarizer 1902, the magneto-optical element 1901, and the analyzer 1903 are thin enough for eliminating the need for compensating for an optical loss, the lenses 1920 and 1921 may be omitted.

The TEM cell 1946 has two holes 1954 formed by, for example, drilling a wall of the cylindrical body thereof. The holes 1954 are aligned in a direction substantially perpendicular to the length of the central conductor 1952 with a given vertical offset, as viewed in the drawing, therefrom. The optical fibers 1908 and 1909 are secured in the holes 1954 by, for example, adhesive to retain the optical modulating device 1910 within the TEM cell 1946. The lenses 1920 and 1921 of the optical modulating device 1910 may alternatively be secured in the holes 1954 as long as the magneto-optical element 1901 is located within a central portion of the TEM cell 1946.

When a high-frequency signal is inputted from a high-frequency signal generator (not shown) which is identical in structure with the ones in the above embodiments, the central conductor 1952 produces a high-frequency field coaxially therewith (i.e., the longitudinal center line of the TEM cell 1946). The direction of the high-frequency field applied to the magneto-optical element 1901, therefore, coincides substantially with the lengthwise direction of the optical modulating device 1910 (i.e., the direction of propagation of the optical signal). When the direction of application of the high-frequency field to the magneto-optical element 1901 exactly coincides with the direction of propagation of the optical signal, it will produce the greatest degree of modulation, but however, the degree of modulation does not decrease greatly when the direction of application of the high-frequency field is within a range of ±15° to the direction of propagation of the optical signal. Specifically, the direction of application of the high-frequency field may be oriented perpendicular to end surfaces of the magneto-optical element 1901 within a range of ±15°.

A dc field generator consists of a dc generator 1930, a dc field generating coil 1931, and a soft magnetic core 1932 for enhancing the efficiency of applying a dc bias field to the magneto-optical element 1901. The dc bias field applied to the optical modulating device 1910 (i.e., the magneto-optical element 1901) traverses the side wall of the optical modulating device 1910 in any direction within a range of ±30° to a line extending perpendicular to the direction of application of the high-frequency field.

The end of the TEM cell 1946 is terminated by a terminator 1950 usually made of a resistor for avoiding the reflection of the high-frequency signal on the end of the TEM cell 1946. If the output impedance of the high-frequency signal generator, the impedance of the TEM cell 1946, and the impedance of the terminator 1950 are set matched to each other, the magneto-optical modulator of this embodiment will be capable of effecting the modulation over a wide range of a low-frequency to a high-frequency, e.g., 0.1 MHz to 2 GHz.

In this embodiment, the impedance adjuster working to adjust the impedance of the high-frequency field generator is, as apparent from the above discussion, implemented by the TEM cell 1946 and the terminator 1950.

In place of the terminator 1950, the end of the TEM cell 1946 may be short-circuited, like a coaxial resonator, or have a filter circuit installed thereon for reflecting a signal component having a specific frequency, thereby enabling a strong or high-power optical signal to be modulated at the specific frequency.

In the structure of this embodiment, the high-frequency field is produced within a space shielded from an electromagnetic wave, so that it is free from external high-frequency noises.

A typical electromagnetic metal shield may be used in each of the above embodiments to avoid unwanted radiation of the high-frequency field. The magneto-optical modulator of this embodiment may be used with any of the optical signal transmission systems as described above.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An optical signal transmission system comprising:
   a light source emitting an optical beam;
   a high-frequency signal generator producing a high-frequency signal;
   a magneto-optical modulator modulating the optical beam emitted from said light source, said magneto-optical modulator including a polarizer, a magneto-optical element, an analyzer, a dc field generator, a high-frequency field generator, and an impedance adjuster, the dc field generator working to apply a dc bias field to the magneto-optical element, the high-frequency generator being responsive to the high-frequency signal from said high-frequency signal generator to apply a high-frequency field to the magneto-optical element, the impedance adjuster working to adjust impedance of the high-frequency field generator;
   an optical fiber transmitting the optical beam modulated by said magneto-optical modulator; and
   an optical receiver receiving the modulated optical beam transmitted through said optical fiber.

2. An optical signal transmission system as set forth in claim 1, wherein the magneto-optical element is made of a multi-domain magneto-optical material, and wherein the dc field generator produces the dc bias field which is greater than a saturation field of the magneto-optical element.

3. An optical signal transmission system as set forth in claim 1, wherein application of the dc bias field to the magneto-optical element is oriented at 90°±30° to a direction of application the high-frequency field to the magneto-optical element.

4. An optical signal transmission system, as set forth in claim 1, wherein a direction of application of the high-frequency field to said magneto-optical element is oriented in a direction of an axis of easy magnetization of said magneto-optical element.

5. An optical signal transmission system as set forth in claim 1, wherein said magneto-optical element has a length, and wherein a direction of application of the high-frequency field to said magneto-optical element is oriented substantially parallel to the length of said magneto-optical element.

6. An optical signal transmission system as set forth in claim 1, wherein said optical fiber is implemented by a graded index optical fiber.

7. An optical signal transmission system as set forth in claim 1, wherein said optical fiber is implemented by a polarization-maintaining fiber.

8. An optical signal transmission system as set forth in claim 1, wherein the optical beam is inputted at 90°±15° to an input surface of the magneto-optical element of said magneto-optical modulator.

9. An optical signal transmission system as set forth in claim 1, wherein said light source is implemented by one of an LED and a fiber laser.

10. An optical signal transmission system as set forth in claim 1, further comprising an optical amplifier disposed between said light source and said magneto-optical modulator.

11. An optical signal transmission system as set forth in claim 1, further comprising a lens disposed between said light source and said magneto-optical modulator.

12. An optical signal transmission system as set forth in claim 1, further comprising a coupler connected to said magneto-optical modulator through said optical fiber and a mirror disposed on an end surface of the magneto-optical element opposite an optical beam input surface thereof to produce a return of the optical beam modulated by the magneto-optical element, said coupler being also connected to said optical receiver to direct the return of the modulated optical beam to said optical receiver.

13. An optical signal transmission system as set forth in claim 1, wherein said high-frequency signal generator is implemented by an antenna designed to receive the high-frequency signal in the form of an electric wave and transmit the high-frequency signal to the high-frequency field generator.

14. An optical signal transmission system as set forth in claim 13, wherein the antenna is one of a Yagi antenna, a loop antenna, and a parabola antenna.

15. A magneto-optical modulator comprising:
   a polarizer to which an optical beam is inputted;
   a magneto-optical element;
   an analyzer outputting the optical beam from said magneto-optical element;
   a dc field generator working to apply a dc bias field to said magneto-optical element;
   a high-frequency field generator working to apply a high-frequency field to said magneto-optical element; and
   an impedance adjuster working to adjust impedance of said high-frequency field generator.

16. A magneto-optical modulator as set forth in claim 15, wherein said magneto-optical element is made of a magneto-optical material which has a multi-domain structure in the absence of application of the dc bias field, and wherein said dc field generator produces the dc bias field which is greater than a saturation field of said magneto-optical element.

17. A magneto-optical modulator as set forth in claim 15, wherein application of the dc bias field to said magneto-optical element is oriented at 90°±30° to a direction of application the high-frequency field to said magneto-optical element.

18. A magneto-optical modulator as set forth in claim 15, wherein a direction of application of the high-frequency field to said magneto-optical element is oriented in a direction of an axis of easy magnetization of said magneto-optical element.

19. A magneto-optical modulator as set forth in claim 15, wherein said magneto-optical element has a length, and wherein a direction of application of the high-frequency field to said magneto-optical element is oriented substantially parallel to the length of said magneto-optical element.

20. A magneto-optical modulator as set forth in claim 15, wherein said magneto-optical element is made of one of a bulk crystal, a polycrystal sintered body, a crystal film, and a composite containing resin and magneto-optical material dispersed in the resin.

21. A magneto-optical modulator as set forth in claim 15, wherein said magneto-optical element is made of a Bi-substituted garnet crystal film.

22. A magneto-optical modulator as set forth in claim 15, wherein a frequency of the high-frequency field is 200 MHz or more.

23. A magneto-optical modulator as set forth in claim 15, wherein said impedance adjuster is implemented by an electric filter designed to allow a high-frequency signal of a preselected frequency to pass therethrough and be applied to said high-frequency field generator or a resonator designed to have the high-frequency signal of the preselected frequency resonate.

24. A magneto-optical modulator as set forth in claim 15, wherein said impedance adjuster is implemented by an electric filter designed to allow high-frequency signals of at least two different frequencies to pass therethrough and be applied to said high-frequency field generator or a resonator designed to have the high-frequency signals of the different frequencies resonate.

25. A magneto-optical modulator as set forth in claim 15, wherein said dc field generator is implemented by permanent magnets.

26. A magneto-optical modulator as set forth in claim 25, wherein each of the permanent magnets is made of one of a ferrite material, a Sm—Co based material, and a Nd—Fe—B based material.

27. A magneto-optical modulator as set forth in claim 15, wherein said dc field generator includes an electromagnet and a dc generator supplying current to the electromagnet.

28. A magneto-optical modulator as set forth in claim 15, wherein said dc field generator forms a substantially closed magnetic circuit.

29. A magneto-optical modulator as set forth in claim 15, wherein said polarizer, said magneto-optical element, and said analyzer are fabricated in a single substrate.

30. A magneto-optical modulator as set forth in claim 15, wherein said polarizer, said magneto-optical element, and said analyzer are interposed between ferules arranged in alignment.

31. A magneto-optical modulator as set forth in claim 15, wherein said high-frequency field generator is installed on an end surface of said magneto-optical element.

32. A magneto-optical modulator as set forth in claim 15, wherein said magneto-optical element is so oriented that the optical beam is inputted at $90°\pm15°$ to an input surface of said magneto-optical element.

33. A magneto-optical modulator as set forth in claim 15, wherein said high-frequency field generator is implemented by a coil whose minimum inner diameter is within a range of 10 $\mu$m to 1000 $\mu$m.

34. A magneto-optical modulator as set forth in claim 15, wherein said magneto-optical element is made of an optical wave guide made of a garnet crystal film.

35. A magneto-optical modulator as set forth in claim 15, wherein said impedance adjuster is made up of a TEM cell and a terminator.

36. A magneto-optical modulator as set forth in claim 35, wherein said impedance adjuster is designed to resonate at a give frequency.

37. A magneto-optical modulator as set forth in claim 15, further comprising an electromagnetic wave shield casing in which said polarizer, said magneto-optical element, said analyzer, and said high-frequency field generator are disposed.

\* \* \* \* \*